United States Patent
Padia et al.

(10) Patent No.: US 10,635,547 B2
(45) Date of Patent: Apr. 28, 2020

(54) GLOBAL NAMING FOR INTER-CLUSTER REPLICATION

(71) Applicant: Nutanix, Inc., San Jose, CA (US)

(72) Inventors: Praveen Kumar Padia, Sunnyvale, CA (US); Bharat Kumar Beedu, Karnataka (IN); Kiran Tatiparthi, Dublin, CA (US); Krishnaveni Budati, Fremont, CA (US); Wangzi He, Cupertino, CA (US)

(73) Assignee: Nutanix, Inc., San Jose, CA (US)

( * ) Notice: Subject to any disclaimer, the term of this patent is extended or adjusted under 35 U.S.C. 154(b) by 71 days.

(21) Appl. No.: 16/051,320

(22) Filed: Jul. 31, 2018

(65) Prior Publication Data
US 2020/0042402 A1   Feb. 6, 2020

(51) Int. Cl.
*G06F 11/14* (2006.01)
*H04L 29/12* (2006.01)
(Continued)

(52) U.S. Cl.
CPC ...... *G06F 11/1464* (2013.01); *G06F 11/0709* (2013.01); *G06F 11/1484* (2013.01);
(Continued)

(58) Field of Classification Search
CPC ............. G06F 11/1464; G06F 11/1484; G06F 11/1492; G06F 11/0709; G06F 16/27; G06F 2201/84; G06F 2201/815; H04L 67/1097; H04L 61/3015
USPC ...................................................... 711/162
See application file for complete search history.

(56) References Cited

U.S. PATENT DOCUMENTS 8,549,518 B1   10/2013  Aron et al.
8,601,473 B1   12/2013  Aron et al.
(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
(Continued)

*Primary Examiner* — Hiep T Nguyen
(74) *Attorney, Agent, or Firm* — Vista IP Law Group, LLP

(57) ABSTRACT

Systems for multi-cluster virtualized computing system management. A method for performing virtual entity replication between source computing clusters and target computing clusters commences upon establishing a virtual entity naming convention that is observed by both the source computing clusters and the target computing clusters. A snapshot from a source cluster is associated with a global snapshot ID before being transmitted to a target computing cluster. At some point in time, the source cluster will initiate acts to replicate a virtual entity to a particular data state that is associated with a particular named snapshot. A second replication protocol then commences. The second replication protocol includes exchanges that serve to determine whether or not the target computing cluster has a copy of a particular named snapshot as named by the global snapshot ID, and if so, to then initiate virtual entity replication at the target computing cluster using the named snapshot.

20 Claims, 21 Drawing Sheets

(51) Int. Cl.
H04L 29/08 (2006.01)
G06F 11/07 (2006.01)
G06F 16/27 (2019.01)

(52) U.S. Cl.
CPC ......... *G06F 11/1492* (2013.01); *G06F 16/27* (2019.01); *H04L 61/3015* (2013.01); *H04L 67/1097* (2013.01); *G06F 2201/815* (2013.01); *G06F 2201/84* (2013.01)

(56) References Cited

U.S. PATENT DOCUMENTS

| | | | |
|---|---|---|---|
| 8,850,130 | B1 | 9/2014 | Aron et al. |
| 9,772,866 | B1 | 9/2017 | Aron et al. |
| 9,946,569 | B1 | 4/2018 | Beedu et al. |
| 2010/0268902 | A1* | 10/2010 | Drobychev ............ G06F 16/13 711/156 |
| 2013/0007506 | A1* | 1/2013 | Jain .................... G06F 11/1484 714/4.12 |
| 2014/0040199 | A1* | 2/2014 | Golab .................. G06F 16/219 707/634 |
| 2016/0042090 | A1* | 2/2016 | Mitkar ................ G06F 11/1448 707/649 |
| 2017/0031774 | A1* | 2/2017 | Bolen ..................... G06F 3/067 |
| 2017/0124103 | A1* | 5/2017 | Zhang .................. G06F 16/188 |
| 2017/0371747 | A1* | 12/2017 | Bortnikov ............ G06F 16/278 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.corn/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Wikipedia. "Universally unique identifier" (Jul. 10, 2018), 11 pages.
Cano, I. et al., "Curator: Self-Managing Storage for Enterprise Clusters", 14th USENIX Symposium on Networked Systems Design and Implementation, NSDI '17, (Mar. 27, 2017).

* cited by examiner

GLOBAL NAMING FOR INTER-CLUSTER REPLICATION

FIELD

This disclosure relates to computing cluster management, and more particularly to techniques for global naming of snapshots used for inter-cluster replication.

BACKGROUND

In many modern computing environments, data is copied from one computing system to another computing system to improve system resilience in case of loss of data at one of the computing systems. For example, a point-in-time snapshot of data might be copied from one computing system to another computing system so that the data can be used in the other system. Making such point-in-time snapshots and copying the snapshots to another computing system on some schedule (e.g., a backup schedule, an incremental backup schedule, etc.) can be used to facilitate capabilities that are known as "replication", "migration", "cloning", etc.

This process of making such point-in-time snapshots and holding them in another computing system becomes more complicated when dealing with inter-system movement of data between computing systems known as clusters. A cluster is a computing system comprising multiple nodes that share a common storage area and a common namespace. Namespaces between computing clusters are different based on the specific configuration of each particular cluster. More specifically, since a computing cluster is a collection of computing nodes where individual ones of the computing nodes access a common storage pool having a single common address space formed of a contiguous set of addresses, it can happen that variations between the configurations of the storage pools of the clusters might influence the syntax and semantics of the name spaces of a particular cluster. Thus, while a particular point-in-time amalgamation of data in the form of backup data in a first cluster might be visible and/or accessible by name in the first cluster, it can happen that the same particular point-in-time amalgamation of data in the first cluster might not be visible or accessible at or by any other cluster. An additional complication arises due to the fact that any metadata that might be used in a first cluster to describe the backup data of the first cluster would not be usable within the namespace and/or context of a different cluster.

This situation is further exacerbated when the two clusters perform their respective own garbage collection operations independently such that neither cluster guarantees to the other cluster that any particular snapshot will be available at any future moment in time.

Unfortunately, this scenario then raises the issue that, since the name spaces and contexts are different between clusters, one cluster might not be able to fully utilize backup data from another cluster. That is, backup data that is available at one cluster might not be identifiable by any other cluster, thus making inter-cluster replication either overly complicated or inefficient. Therefore, what is needed is a better way to manage replication of data between clusters.

SUMMARY

The present disclosure describes techniques used in systems, methods, and in computer program products for global naming for inter-cluster replication, which techniques advance the relevant technologies to address technological issues with legacy approaches. More specifically, the present disclosure describes techniques used in systems, methods, and in computer program products for global naming of distributed point-in-time snapshots. Certain embodiments are directed to technological solutions for carrying out an inter-cluster protocol such that a source cluster can ascertain whether or not a target cluster is able to construct a data state that comports with a particular data state that is identified by the source cluster using a global name.

The disclosed embodiments modify and improve over legacy approaches. In particular, the herein-disclosed techniques provide technical solutions that address the technical problems attendant to resolving name space differences and context differences when performing replication operations between clusters. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. For example, when performing operations pertaining to resolving name space differences and context differences (e.g., when migrating virtual entities between clusters), both memory usage and CPU cycles demanded are dramatically reduced as compared to the memory usage and CPU cycles that would be needed but for application of the herein-disclosed techniques for carrying out the inter-cluster protocol for ascertaining whether or not a target cluster is able to construct data to comport with a particular data state that is identified by the source cluster using a global name.

Some embodiments disclosed herein use techniques to improve the functioning of multiple systems within the disclosed environments, and some embodiments advance peripheral technical fields as well. As specific examples, use of the disclosed computer equipment, networking equipment, and constituent devices within the shown environments as described herein and as depicted in the figures provide advances in the technical field of hyperconverged computing platform management as well as advances in various technical fields related to distributed storage systems.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
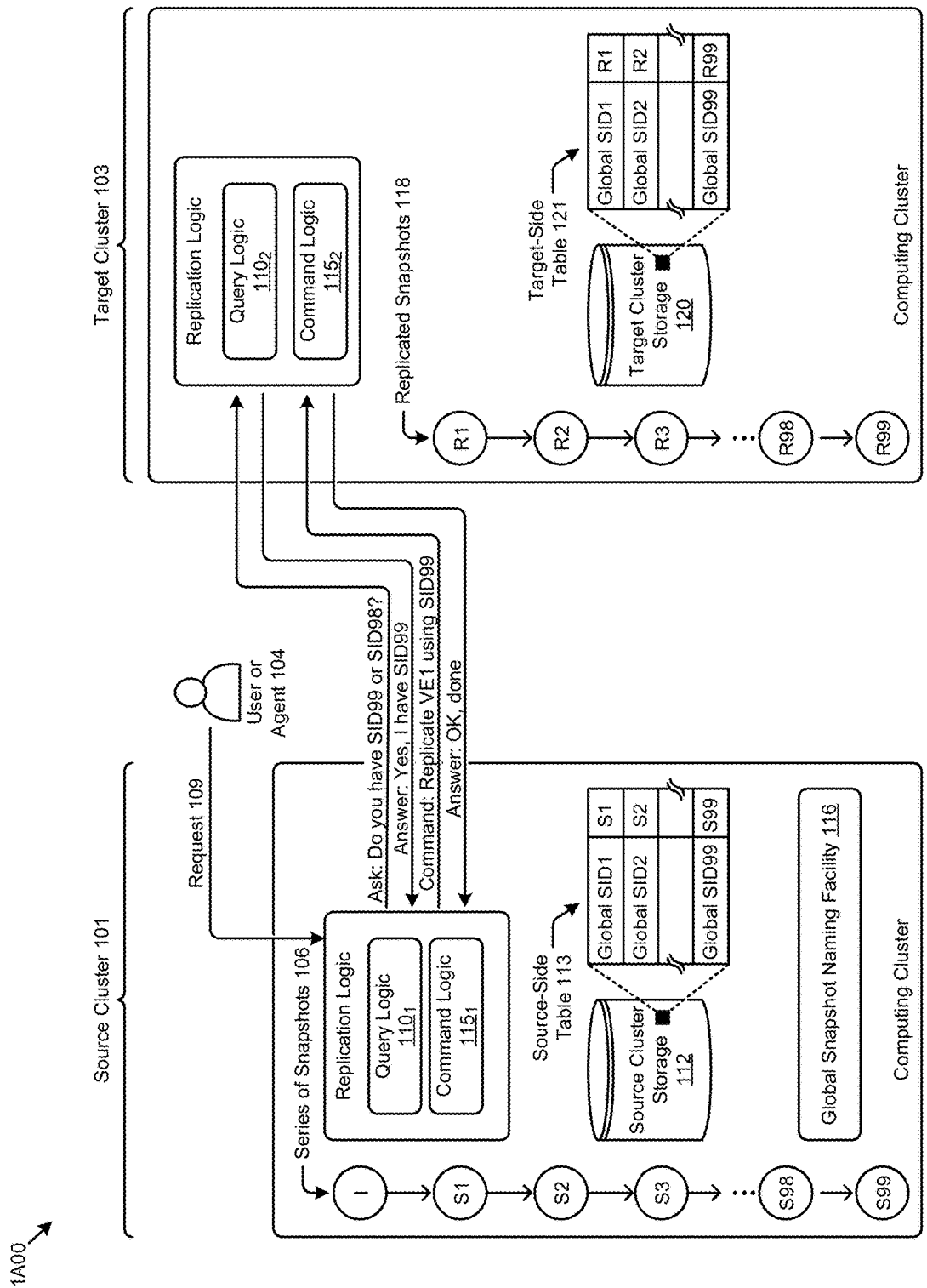
FIG. 1A exemplifies a multi-cluster environment in which global naming of snapshots are used for inter-cluster virtual entity (VE) management, according to an embodiment.

Embodiments in accordance with the present disclosure address the problem of resolving name space differences and context differences when performing replication operations between clusters. Some embodiments are directed to approaches for carrying out an inter-cluster protocol such that a source cluster can ascertain whether or not a target cluster is able to construct data to comport with a particular data state that is identified by the source cluster using a global name. The accompanying figures and discussions herein present example environments, systems, methods, and computer program products for global naming of distributed point-in-time snapshots.

Overview

In a computing environment that is composed of a plurality of computing clusters, data is often "backed-up" or "replicated" periodically from one cluster to another cluster. Such replication of data into periodic "snapshots" provides a "disaster recovery" path should one of the computing clusters suffer an outage. Replication of data from one cluster to another cluster is often accomplished by periodically sending just the changes that have been made to a base set of data to the other cluster. For example, if a base set of data at time t=T0 comprising data blocks #1, #2, and #3 undergoes a change at time t=T1 by, for instance, changing something in block #3 while leaving block #1 and block #2 unchanged, then the full state of the data at time t=T1 can be constructed by "applying" the time t=T1 changes on block #3 to the state of the base set of data of time t=T0. This technique can be extended such that the state of data at a given point in time can be constructed by applying a series of successive changes to the base data. Such snapshotting techniques can be used to apply the changes made to the base data up through a given point time.

However, applying many changes (e.g., millions of changes) to a base set can be computing resource intensive. To avoid the possibility of having to apply a very large set of changes, many systems process smaller change sets periodically to generate an "updated" base set. For example, a new, "updated" base set might be generated periodically when there are 10,000 change sets to be applied to a base set, after which application the 10,000 change sets can be deleted (e.g., since the changes have been captured into the new "updated" base set) or marked for subsequent deletion or otherwise processed for "garbage collection".

In the context of an environment that is composed of a plurality of computing clusters, at least two of which operate independently from one another to facilitate disaster recovery, even though one of the clusters is supposed to have a copy of the other's data (e.g., for recovery), the set of changes that are available at one site (e.g., to be applied to a base set) might be different from the set of changes that are available at the other site. This can happen due to asynchronous operation of the clusters, and/or by operation of the aforementioned "garbage collection".

When performing certain inter-cluster operations such as cloning or migrating a virtual entity from a source cluster to a target cluster, the determination as to whether or not a particular target cluster has a copy of a base set of data, and/or whether or not it is able to construct data to a particular data state, is needed prior to the migration.

Keeping track of which clusters have which change sets and/or which changes sets have been deleted can be challenging, especially when there are many clusters in the environment, keeping an up-to-date and accurate accounting of which clusters have which change sets can be burdensome. For example, keeping track of which clusters have which change sets becomes especially complicated when a particular cluster, say cluster "Alpha", uses cluster "Beta" as a disaster recovery failover site for some set of tenants of cluster "Alpha", and cluster "Beta" in turn uses cluster "Gamma" as a disaster recovery failover site for some set of its tenants, and so on. Approaches that rely on a centralized data structure and/or a centralized service to account for change sets are fragile in that a centralized facility can go down. Furthermore, maintenance of such centralized facilities is very complicated in that each cluster has its own namespace and/or naming convention as well as its own garbage collection schedule and technique.

Alternative approaches that avoid centralized facilities, and instead rely on distributed facilities at many different clusters to account for change sets, are far too "chatty" since all change sets to be tracked (e.g., available or deleted) need to be communicated to each one of the clusters, thus incurring an undesirable load on the network.

The aforementioned problems are especially acute when dealing with storage pools (e.g., collections of many types of storage devices). Specifically, since a computing cluster is a collection of computing nodes where individual ones of the computing nodes access a common storage pool having a single common address space formed of a contiguous set of addresses, variations in the size, configuration and namespaces of the clusters may vary. For example, since the storage pool of a cluster is composed of many different storage devices having respective naming and addressing characteristics, then even though the address space of each successive storage device is logically abutted to the address space of its predecessor storage device, the device-level addressing might be different for each device, and therefore different between clusters.

Disclosed herein are techniques to perform "disaster recovery", "migration", "cloning" etc. between clusters. One embodiment discloses a protocol such that a source cluster can ascertain whether or not a target cluster has a copy of a particular base set of data, and/or whether or not it is able to construct data to comport with a particular data state that is known/defined at the source cluster. More specifically, the appended figures and discussions thereof disclose techniques for inter-cluster communications that facilitate making determinations as to whether or not a target cluster is able to construct data to comport with a particular data state that is needed for carrying out operations pertaining to "disaster recovery", virtual machine "migration", virtual entity "cloning" etc. The disclosed techniques can be applied in many multi-cluster scenarios, including when the different clusters observe different naming semantics, and/or different garbage collection logic and/or different deduplication logic, etc.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

One efficient approach for managing replication operations between clusters involves devising an agreed-upon regime of disaster recover data naming such that, once named, a unit of disaster recovery data can thenceforth be referenced by any cluster, regardless of the name spaces involved. Once such a regime begins, two subject clusters can carry out a computer-implemented protocol such that determinations can be made as to whether or not a target cluster has the named unit of disaster recovery data. If so, replication operations (e.g., restore, clone, migrate) can begin. If not, additional portions of the protocol can be carried out to identify "second best" units of disaster recovery data. The aforementioned regime can be implemented in many environments involving many different cluster topologies. The following figure is merely for illustration. Other topologies of clusters and/or other topologies for multi-cluster communications are possible.

FIG. 1A exemplifies a multi-cluster environment 1A00 in which global naming of snapshots are used for inter-cluster virtual entity (VE) management. As an option, one or more variations of multi-cluster environment 1A00 or any aspect thereof may be implemented in the context of the architecture and functionality of the embodiments described herein.

FIG. 1A illustrates an inter-cluster protocol that is used to ascertain whether or not a target cluster is able to construct a data state that comports with a particular data state specified by a source cluster. Specifically, the figure is being presented to highlight how each cluster associates a global name with a respective cluster-specific name. The figure also depicts inter-cluster communication in the form of a query/response protocol. The query-response protocol, in combination with the shown cluster-specific metadata tables serve to resolve name and context differences when performing replication operations between clusters.

As shown, the protocol is carried out between source cluster 101 and target cluster 103. When processes run on the source cluster, the processes generate data, which data is stored in source cluster storage 112. Metadata is generated for items stored in the source cluster storage. The namespace for any items stored in any cluster can be defined at the time the cluster is deployed. The namespace for any items stored in a particular cluster storage is specific to the cluster. Namespaces between clusters are not shared. As such, when data items are stored on target cluster 103 in target cluster storage 120, the metadata for such data items in target cluster 103 are unique to that cluster.

In many disaster recovery (DR) settings data from a first cluster is replicated to a second cluster. Often, the clusters are geographically separated to reduce the likelihood that both clusters would be affected by the same effects that would cause a data loss. Nevertheless, the clusters can communicate (e.g., over the Internet) and do communicate on an ongoing basis to maintain readiness for disaster recovery operations. As one specific example of maintaining readiness for disaster recovery operations, a source cluster generates a series of snapshots 106 shown as snapshot S1, snapshot S2, snapshot S3, . . . , snapshot S99). The snapshots formed on the source cluster are sent periodically to the target cluster. Since the name spaces between clusters differ, the name of a snapshot from the source cluster (e.g., snapshot S99) will be named differently at the target cluster. This is shown in FIG. 1 through the correspondence between "S1" and "R1", and "S2" and R2", and so on.

In the context of disaster recovery, and to address the differences in the name spaces between clusters, a cluster-agnostic name is generated for each snapshot. For example, and as shown, the snapshot S1 on source cluster 101 is assigned a global snapshot ID. This is shown in the source-side table 113 for source cluster 101 as "Global SID1" that is associated with snapshot S1. When the source cluster sends a snapshot to the target cluster, it is sent with a corresponding cluster-agnostic global snapshot ID. This cluster-agnostic global snapshot ID can be used by any number of clusters, thus, in disaster recovery architectures where there are N disaster recovery sites, any of the clusters can use the cluster-agnostic global snapshot ID to refer to that cluster's copy of the snapshot. This is shown by the target-side table 121. Specifically, in the target-side table, the global snapshot IDs each correspond to a target-side copy of the snapshot. The aforementioned table is merely one example data structure used to codify a relationship between a snapshot that is associated with a global snapshot ID. In some situations, the relationships are codified as key-value pairs, which key-value pairs are made accessible to the nodes of a cluster.

As time progresses, the source cluster generates snapshots, and for each generated snapshot, a global snapshot naming facility 116 is employed to generate a global snapshot ID. For each of a series of snapshots 106, the snapshot data, together with its assigned name, is transmitted to the target cluster. The target cluster in turn replicates the transmitted snapshots in its namespace, and associates the replicated snapshots 118 with the specified global snapshot ID. This process of forming snapshots at the source cluster and transmitting to one or more target clusters can proceed over a long period of time, during which time the target cluster accumulates replicated snapshots (e.g., replicated snapshot R1, replicated snapshot R2, replicated snapshot R3, . . . , replicated snapshot R99). More specifically, an instance of query logic $110_1$ at the source cluster coordinates transmission of snapshots with an instance of query logic $110_2$ at the target cluster.

Respective instances of command logic (e.g., command logic $115_1$ and command logic $115_2$) operate to continuously make disaster recovery copies of the snapshots. Over time, many snapshots are accumulated, and at some point in time, a cluster might invoke garbage collection operations. The two clusters operate their respective query logic such that restoration operations can be carried out autonomously in the event of a disaster or can be carried out under administrative control. For example, a user or agent 104 at the source cluster might make a request 109 for some sort of restoration of data that, for example, had been deleted by garbage collection at the source cluster. Inasmuch as garbage collection operations are performed at each cluster independently, the mere fact that a particular snapshot has been deleted by garbage collection operations at the source cluster does not imply that that same snapshot had been deleted by target cluster garbage collection operations at the target cluster. Therefore, it is reasonable for the source cluster to query the target cluster to ascertain whether or not the target cluster has the snapshot data of interest.

The particular snapshot data of interest, possibly involving multiple snapshots, can be referred to by corresponding global snapshot IDs. As such, a question in the form of a query, "Do you have SID99 or SID98?" can be formed by query logic $110_1$ at the source cluster, and then received and processed by query logic $110_2$ at the target cluster. In this example, the target cluster provides a response to the query in the form of an answer, "Yes, I have SID99". The source cluster might issue a command, "Replicate VE1 using SID99", to which command the target cluster can then respond by cloning VE1 using snapshot SID99, and thereafter providing an acknowledgement such as "OK, done". In an alternative scenario, the target's answer to the question, "Do you have snapshot SID99 or snapshot SID98?" might be, "I don't have snapshot SID99, but I do have snapshot SID98". This can happen when, for example, if activities to produce the snapshot corresponding to SID99 at the target site were still in progress. In this scenario, the source site would be aware of the existence of its own copy of the snapshot corresponding SID99 even before the snapshot corresponding to SID99 has been formed at the target site.

The foregoing discussion includes mention of snapshots that capture a particular data state at a particular time, the operation of garbage collection, and the operation of restoration of a snapshot to reproduce a desired data state. There are many techniques for making snapshots, performing garbage collection over snapshots, and for restoring the snapshots to a particular data state. Some example techniques are shown and described as pertains to FIG. 1B. Specifically, FIG. 1B discusses use of snapshots to capture a point-in-time data state of any sort of virtual entity (VE).

Figure 1B:
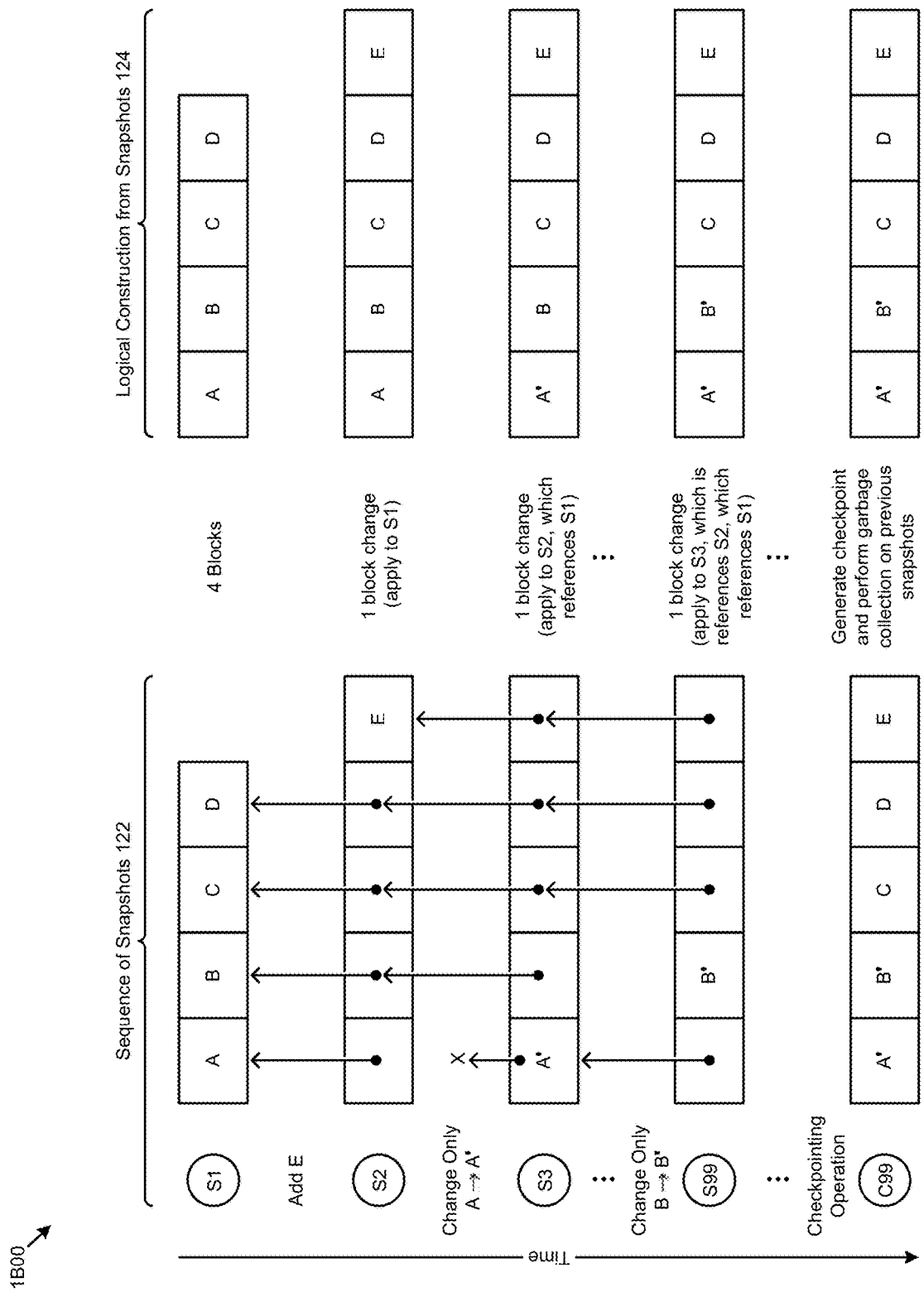
FIG. 1B depicts a data state construction technique as used in systems where global naming of snapshots are used for inter-cluster virtual entity management, according to an embodiment.

FIG. 1B depicts a data state construction technique 1B00 as used in systems where global naming of snapshots are used for inter-cluster virtual entity management. As an option, one or more variations of data state construction technique 1B00 or any aspect thereof may be implemented in the context of the architecture and functionality of the embodiments described herein. The data state construction technique 1B00 or any aspect thereof may be implemented in any environment and/or for any sort of entity. More particularly, data state construction technique 1B00 can be used to capture a data state for a virtual disk (vDisk) or a virtual machine configuration, or a virtual network interface (vNIC), etc.

FIG. 1B illustrates a technique for forming a sequence of snapshots 122 that refer to previously captured snapshots. Specifically, an initial data state comprising a series of blocks is captured as snapshot S1. This is shown as snapshot S1 that comprises four data blocks, namely block A, block B, block C, and block D. The snapshot for the shown entity comprises the actual data of the foregoing blocks. At some later moment in time, the entity might be augmented to comprise new block E. The addition of block E does not by itself change the other data of the entity, therefore at that point in time, a compact form of snapshot S2 can be formed by referring to the previously captured snapshot S1 by reference, then adding the actual data of block E. This is shown in the depiction of the logical construction from snapshots 124. Specifically, the logical contents of each of the incremental snapshots is shown to the right of each snapshot S1, S2, S3, . . . , S99, . . . , and C99.

As is known in the art, a reference might be made using only a few bytes. As such the size of snapshot S2 is roughly the size of block E, plus the additional bytes needed to refer to data in previously captured snapshot S1. This process can continue, with successive changes being represented in compact form. Snapshot S3 captures the change of block A to block A' and so on. Periodically, a series of compact snapshots can be checkpointed by bringing in the actual data of all blocks as referenced back to previous snapshots. This is accomplished by a checkpointing operation that results in checkpoint snapshot C99, which corresponds to the just prior snapshot S99.

Garbage collection can operate continuously and independently from snapshotting and checkpointing operations. In some cases, a garbage collector can analyze the makeup of a particular snapshot and determine if previous snapshots can be deleted. In the example of FIG. 1B, at a time after generation of checkpoint snapshot C99, the series of compact snapshots S1, S2, S3, and S99 can be deleted and any blocks that were used in the snapshots can be returned to a storage pool for later use.

Figure 2:
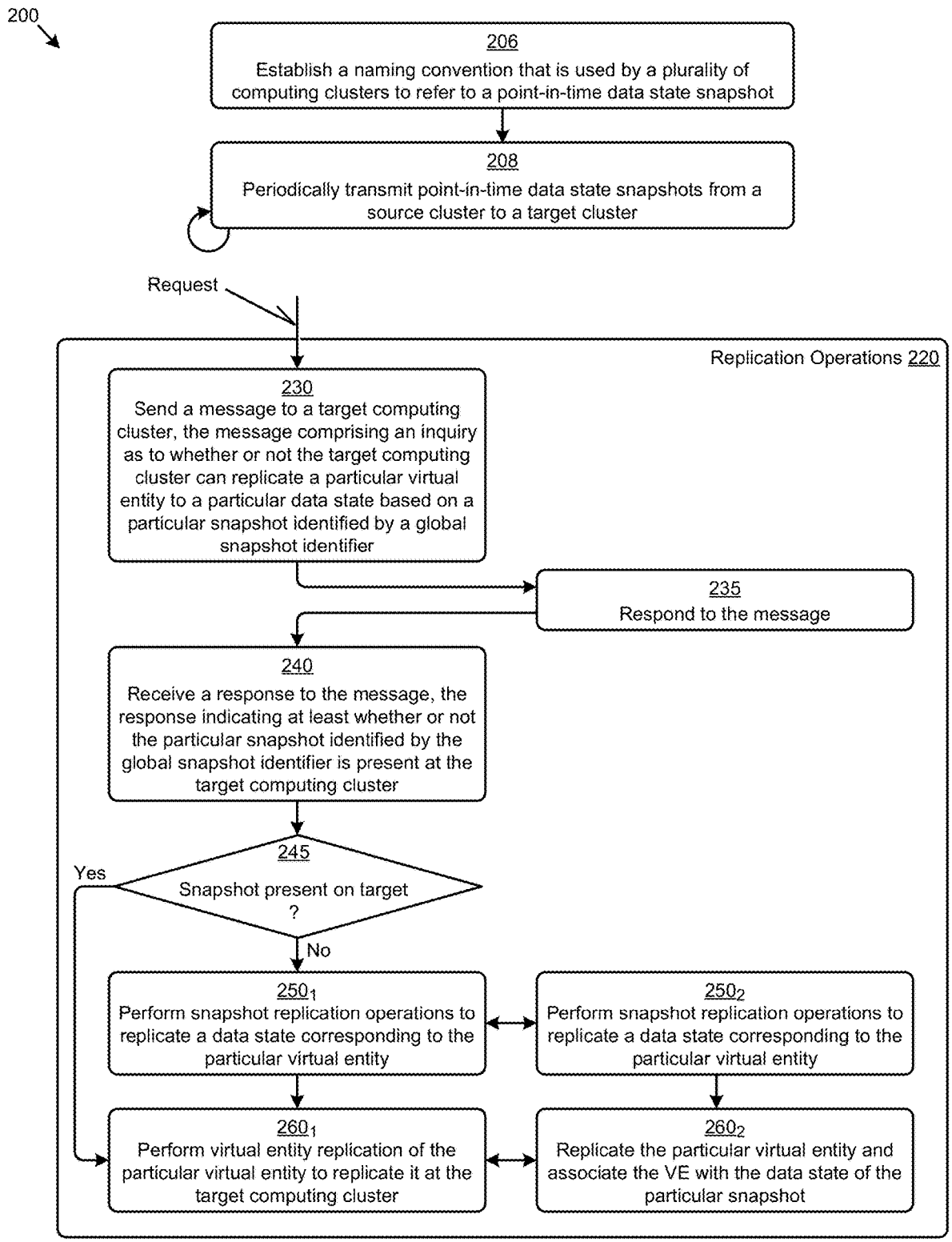
FIG. 2 illustrates inter-cluster communication between systems that use snapshots to establish a base data state for a virtual entity, according to an embodiment.

The foregoing discussion of FIG. 1B describes snapshots and garbage collection, and the foregoing discussion of FIG. 1A discusses one particular protocol exchange between two DR clusters. FIG. 2 is now presented to illustrate how to configure and operate a DR environment such that any virtual entity can be restored to any captured data state even when the namespaces between clusters in the DR environment are different.

FIG. 2 illustrates inter-cluster communication 200 between systems that use snapshots to establish a base data state for a virtual entity. As an option, one or more variations of inter-cluster communication 200 or any aspect thereof may be implemented in the context of the architecture and functionality of the embodiments described herein. The inter-cluster communication 200 or any aspect thereof may be implemented in any environment.

FIG. 2 is being presented to illustrate establishment of a global naming convention between clusters in a DR environment, and then to use global names in a protocol. More specifically, FIG. 2 illustrates how two clusters can carry out an inter-cluster protocol such that a source cluster can ascertain whether or not a target cluster is able to construct a data state that comports with a particular data state specified by a source cluster using a global name.

As shown, step 206 serves to establish an environment-wide naming convention. The naming convention is observed by pairs of clusters that operate in the computing environment. The naming convention is used to name snapshots that refer to the same data state, even though each cluster has its own namespace. In some embodiments, the global snapshot ID is a universally unique identifier (UUID) having a length of 128 bits or more.

On a continuous basis, replication operations are performed between pairs of clusters (step 208). Specifically, snapshots generated at a source cluster are given a global name in accordance with the environment-wide naming convention and then transmitted to a target cluster together with that snapshot's global name. The two clusters populate respective data structures to associate a global name with a snapshot identifier. The cluster-local snapshot identifier at the source cluster is different than the cluster-local snapshot identifier at the target cluster; however, since both the source cluster and the target cluster respect the global name and since both the source cluster and the target cluster associate the global name with their respective cluster-local storage of the snapshot, a particular snapshot can be referenced without ambiguity. The replication operations of step 208 can continue to operate even while other replication operations (e.g., the replication operations of step 220) are being performed.

Upon an event such as the shown request, a set of replication operations 220 are initiated. The request might comprise any form of DR operations including, but not limited to, cloning of a VE, migrating of a VE, restoring a VE to a previous data state, and so on. Such DR operations need not be responsive to any sort of disaster, however, any of the foregoing DR operations might be invoked in response to some sort of computing equipment outage.

In the example of FIG. 2, the received request is a request to replicate a particular virtual entity at the target cluster based on an earlier known data state. Strictly as one illustrative example, the received request to replicate a particular virtual entity at the target cluster based on an earlier known data state might correspond to a cloning operation for the particular virtual entity.

At step 230, the source cluster considers the request and forms a query in the form of a message to the target cluster. The query asks the target cluster if the target cluster is able to restore the virtual entity to a particular specified data state. The particular specified data state can be defined as a named snapshot (e.g., using a global snapshot ID), or the particular specified data state can be defined as a named snapshot that might have dependencies, and those dependencies might themselves have further dependencies, and so on. In some cases, the query that is sent to the target cluster includes multiple global snapshot IDs. The target can choose which of the multiple global snapshot IDs is the most suitable snapshot to use to generate the particular specified data state at the target. Suitability might depend in part on the processing power required for the target cluster to use a particular snapshot. The processing power in turn might depend in part on the presence of the dependencies at the target and/or the processing power that the target might need to reconstruct a data state based on dependencies.

As earlier indicated, since garbage collection is carried out independently by both the source cluster and the target cluster, it might be the case that the snapshot that corresponds to the desired data state had been deleted in the garbage collection process. Accordingly, it is possible that the target cluster can respond either "Yes" (e.g., if there is at least one suitable snapshot to use for generating the particular specified data state at the target) or "No" (e.g., if there no suitable snapshot to use for generating the particular specified data state at the target).

At step 235 the target cluster determines if its response is "Yes" or "No" and replies to the inquiry. The response from the target cluster is received by the source cluster at step 240, after which a path from decision 245 is taken. If the target cluster had indicated "Yes" (i.e., it has the snapshot corresponding to the global snapshot ID), then the source cluster initiates virtual entity replication (step $260_1$), which carries out a replication protocol with the target cluster to replicate the virtual entity to the named data state (step $260_2$). If the target cluster had indicated "No" (i.e., it does not have the snapshot corresponding to the global snapshot ID), then the source cluster initiates replication of the snapshot named by the global snapshot ID to the target cluster (step $250_1$). Performance of a replication protocol between the source cluster and the target cluster serves to replicate the snapshot named by the global snapshot ID from the source cluster to the target cluster (step $250_2$). In some cases, performance of step $250_2$ includes replicating not only the snapshot named by the global snapshot ID, but also a set of virtual entities that are covered by the particular snapshot named by the global snapshot ID.

In most cases, there are a plurality of snapshots available at a target cluster, any of which plurality of snapshots can be used to restore a data state to a particular VE. Moreover, a source cluster might be able to generate a list of snapshots, all of which can be named using the global snapshot naming convention. As such, the source cluster might send the target cluster an ordered list of possible snapshots to be used. The target cluster in turn can select from the list. In this manner, even if there are some snapshots that had been deleted due to garbage collection, there might be several other possibilities to accomplish the same data state restoration.

There are many scenarios that can be served by the foregoing protocol. One such scenario is shown and described in the following sequence of figures.

FIG. 3A through FIG. 3I illustrate an inter-cluster communication scenario 300 as carried out between disaster recovery clusters.

The scenario involves sending/receiving inter-cluster messages 304 to: (1) establish an initial state, (2) communicate a series of snapshots from source site 302 to target site 306, and (3) use one or more of those snapshots to replicate VEs. The shown scenario also involves performing garbage collection at the target site.

Figure 3A:
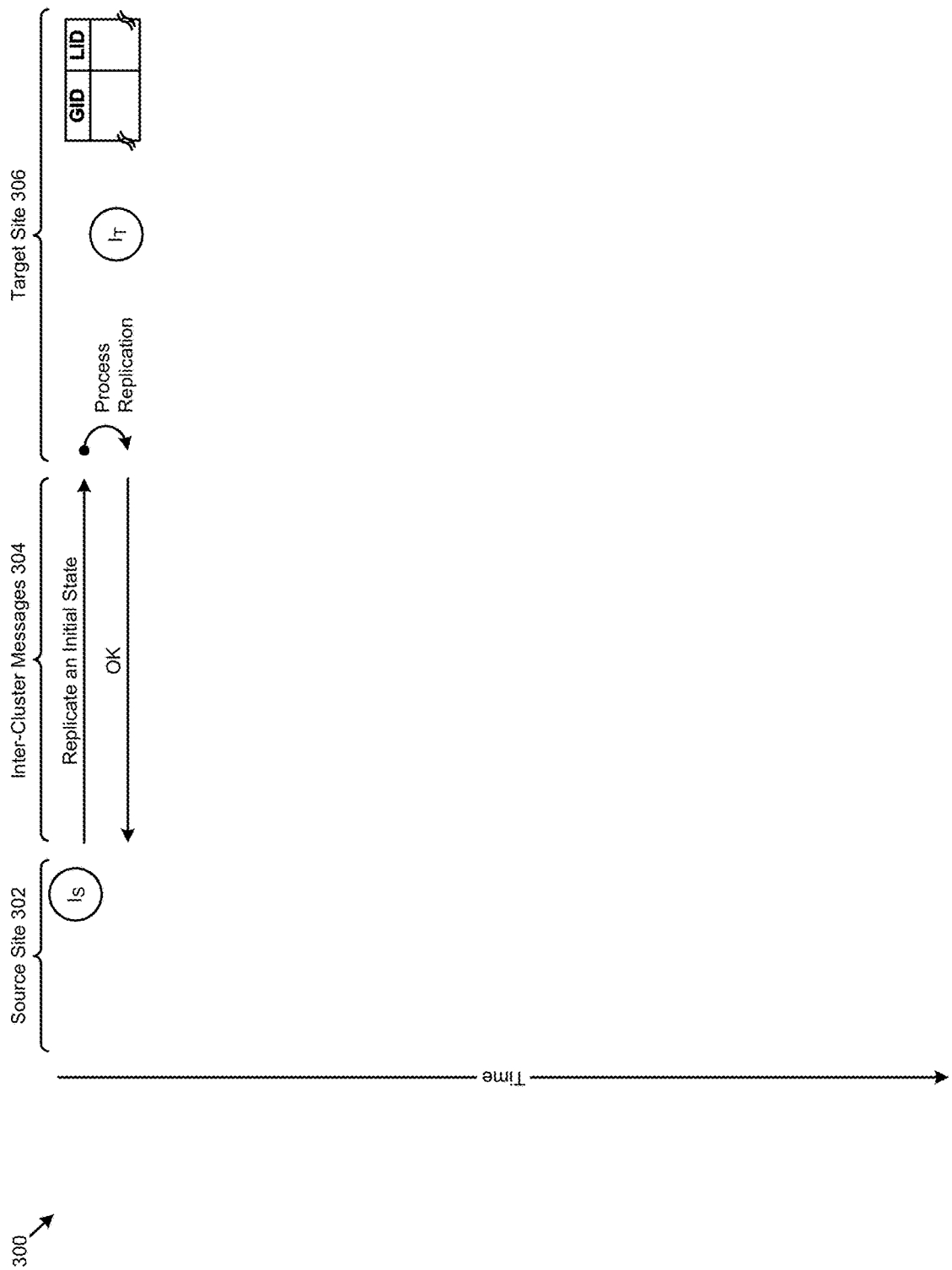
FIG. 3A through FIG. 3I illustrate an inter-cluster communication scenario as carried out between disaster recovery clusters, according to an embodiment.

As shown in FIG. 3A, the source site prepares a dataset that corresponds to a source-side initial state Is. This dataset is transmitted to the target site where the target site replicates the dataset as a target-side initial state IT in its own namespace and replies to the source site with an "OK" message to indicate completion of storage of the initial state at the target. The target site also initializes a table that is ready to be populated with entries that associate a global snapshot ID (e.g., in the column labeled GID) with a local name (e.g., in the column labeled LID) that refers to the stored data in the target site.

Figure 3B:
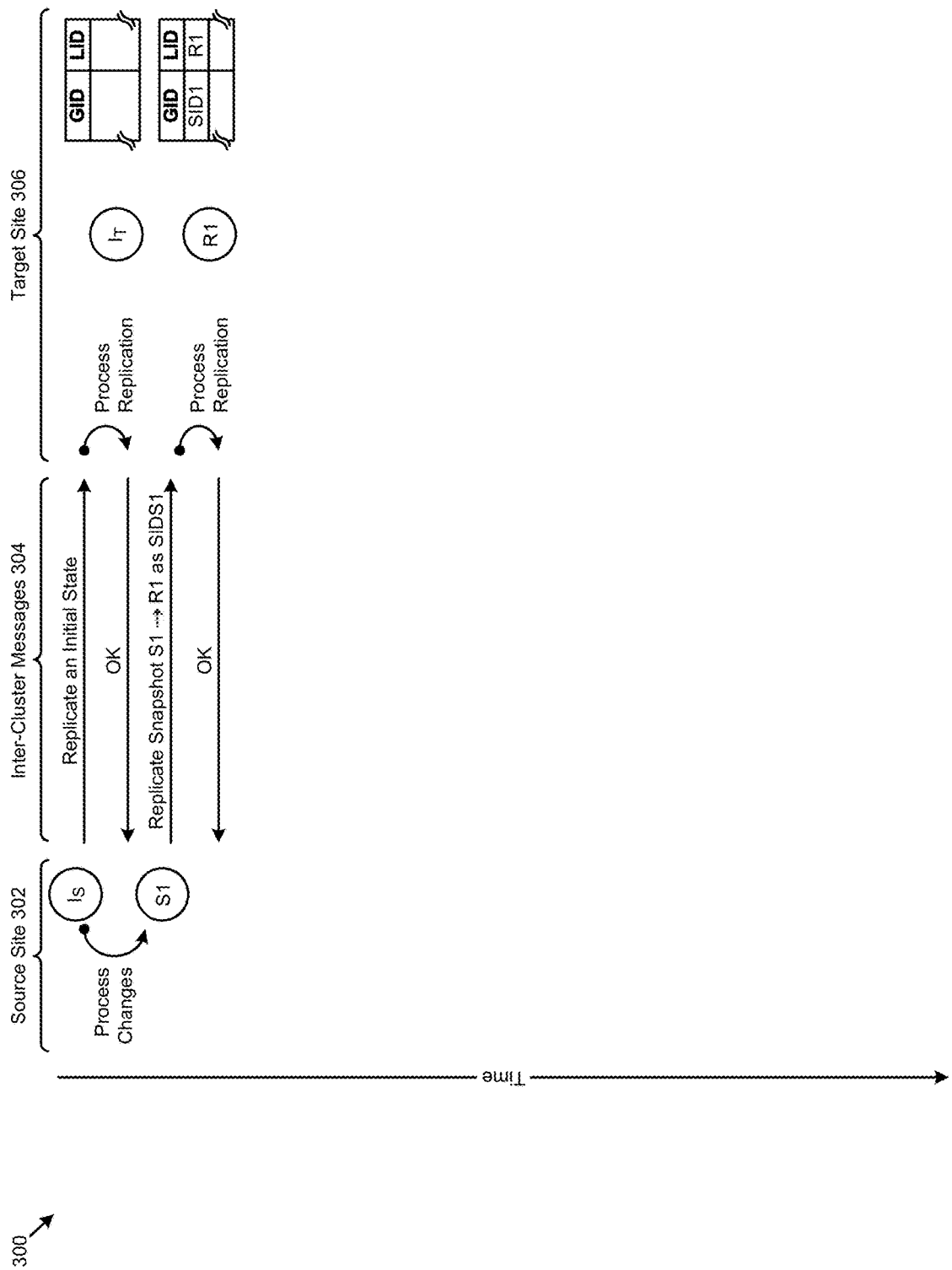

At some later moment in time, changes may occur that affect the initial state of the source site. As shown in FIG. 3B, the changes are processed to generate snapshot S1. The source site then sends snapshot S1 and a command to the target site. The command specifies to the target site to replicate snapshot S1 and associate the replicated snapshot R1 with the generated global ID SID1. This association is recorded in the data structure.

Figure 3C:
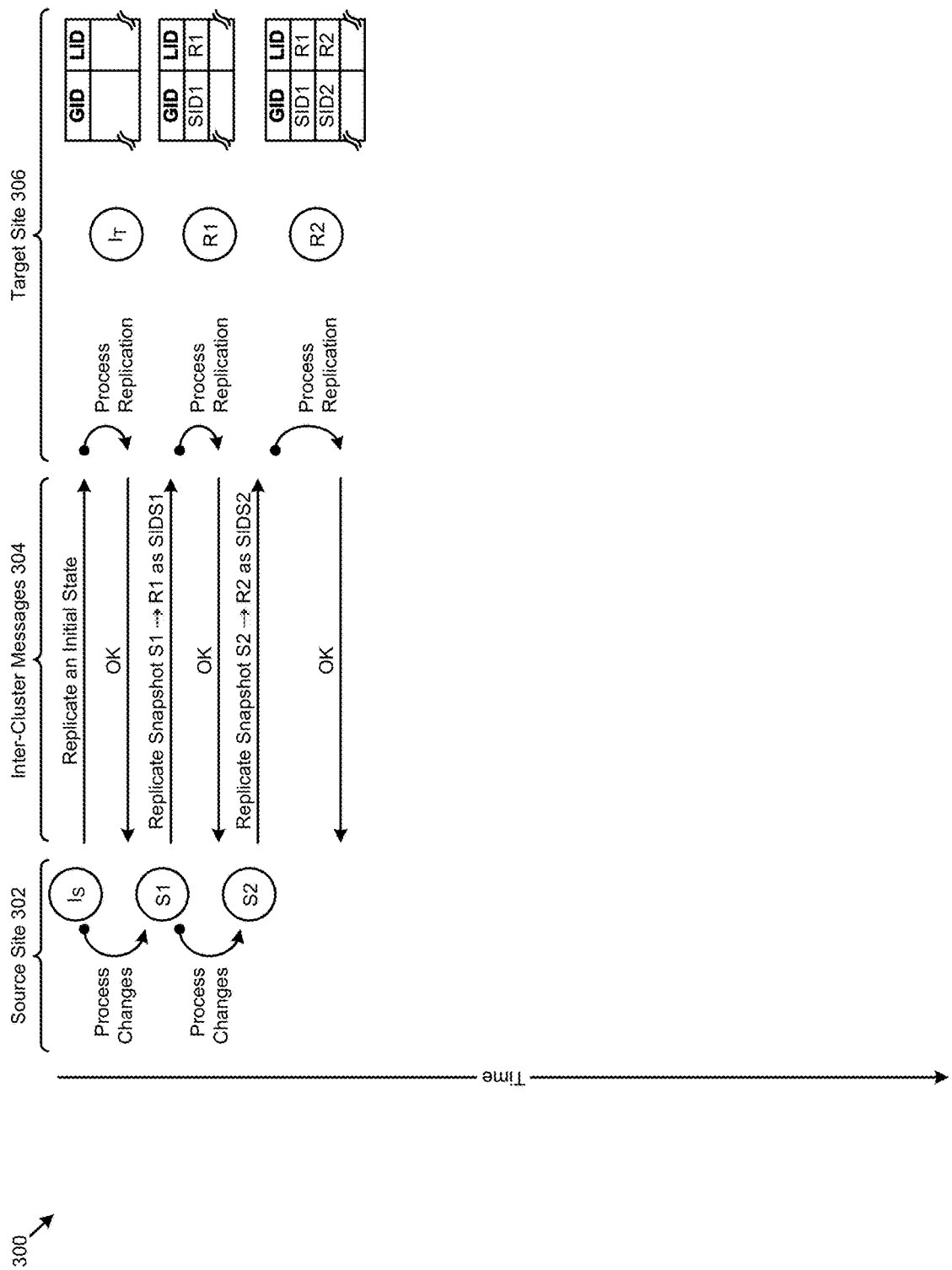

At some still later moment in time, changes may occur that are captured in snapshot S2. As shown in FIG. 3C, the source site then sends snapshot S2 and a command to the target site. The command specifies to the target site to replicate snapshot S2 and associate the replicated snapshot R2 with the generated global ID SID2. This association is added to the data structure.

Figure 3D:
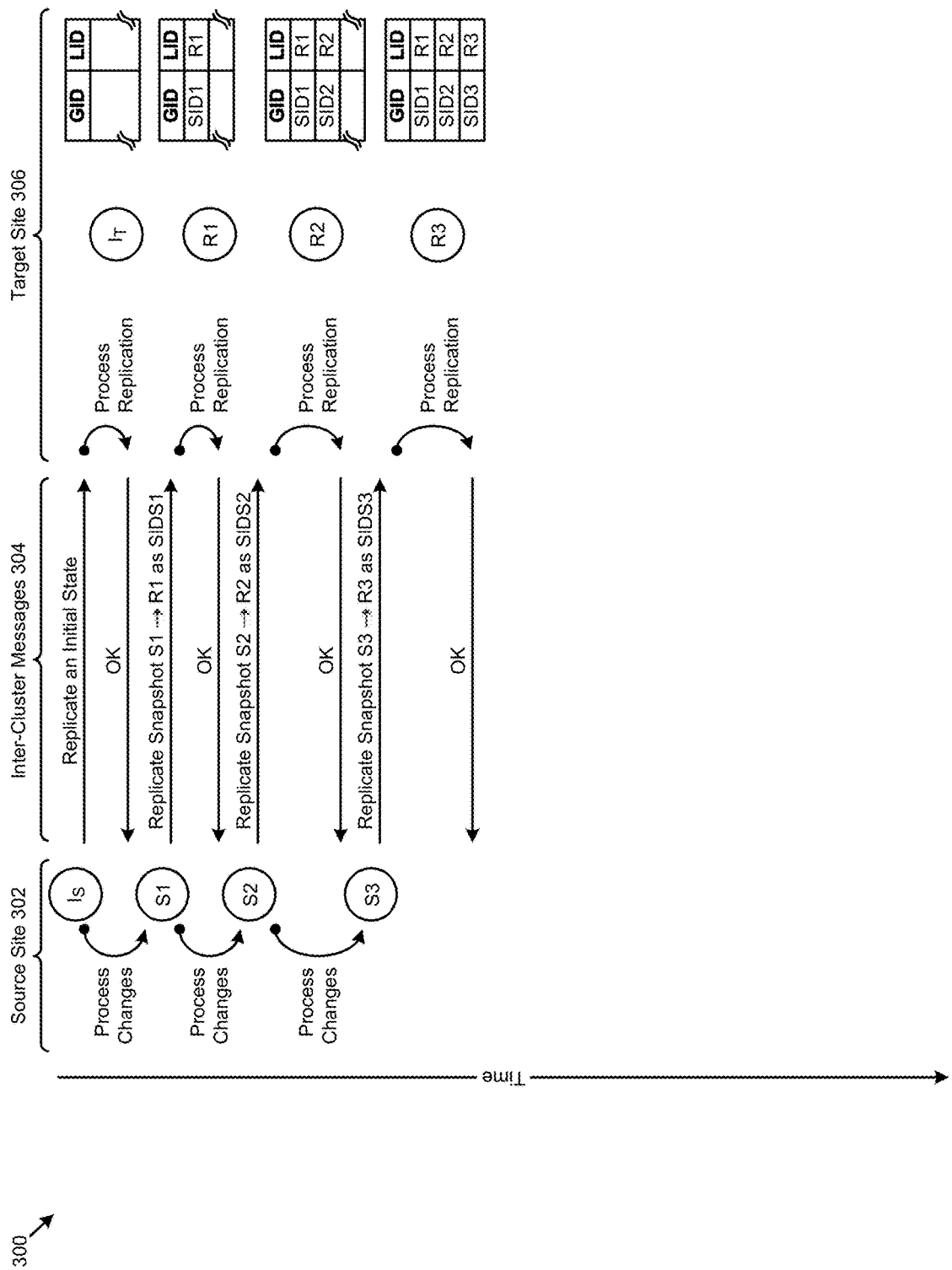

At some even still later moment in time, changes may occur that are captured in snapshot S3. As shown in FIG. 3D, the source site then sends snapshot S3 and a command to the target site. The command specifies to the target site to replicate snapshot S3 and associate the replicated snapshot R3 with the generated global ID SID3. This association is added to the data structure.

Figure 3E:
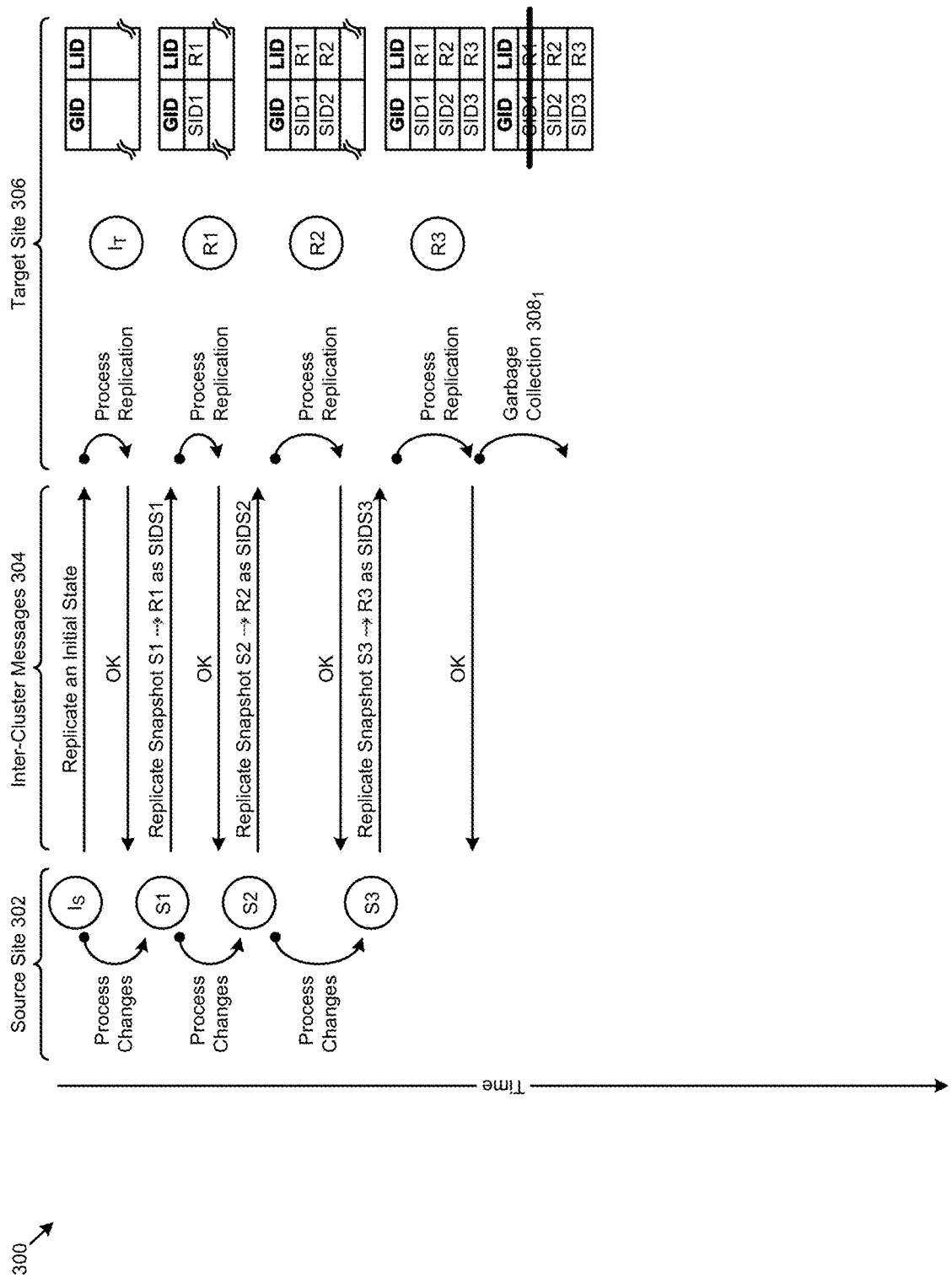
Figure 3F:
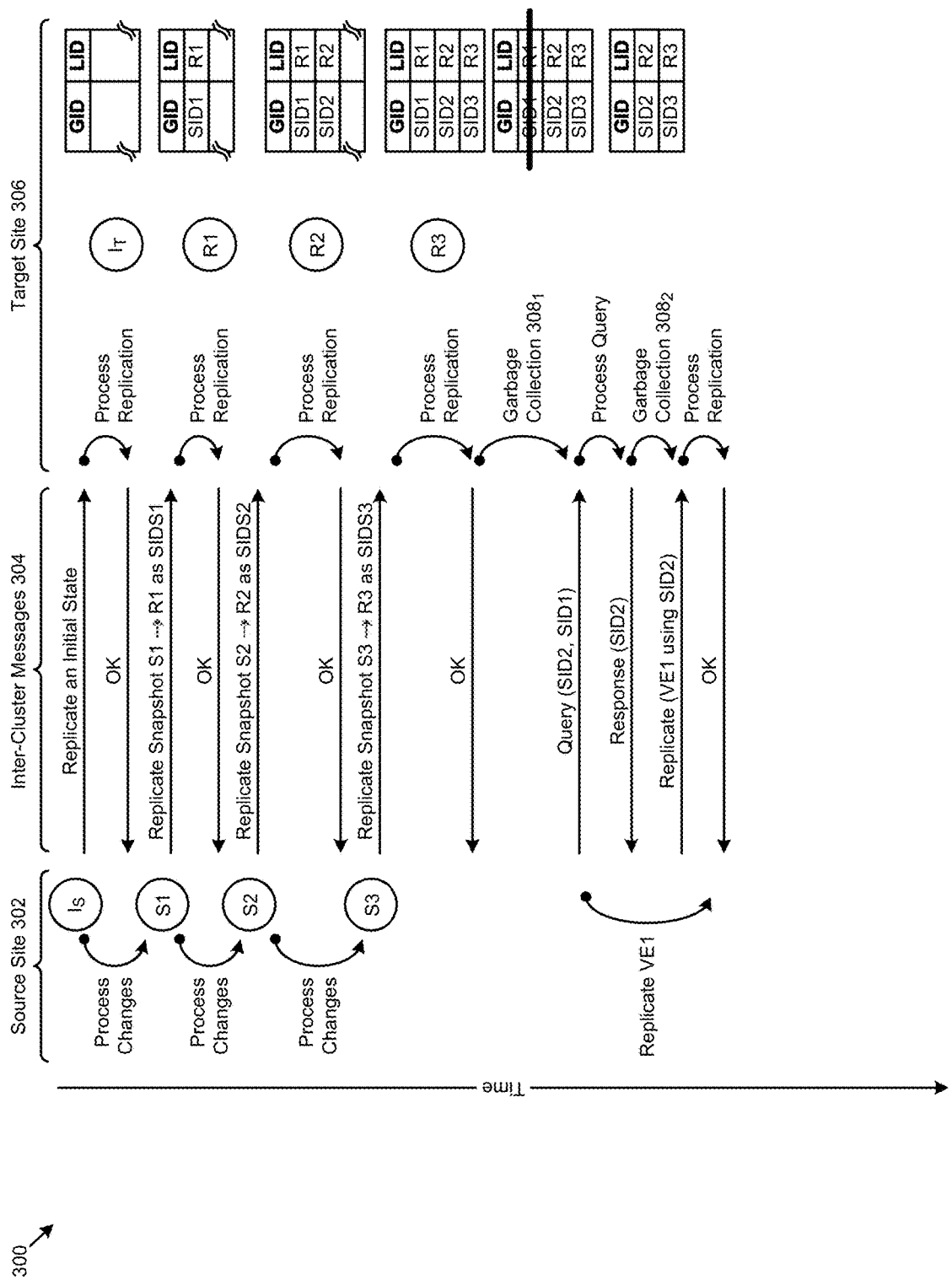

The two clusters continue to run independently. FIG. 3E depicts carrying out garbage collection $308_1$ by the target cluster. In the course of performing garbage collection, the replicated snapshot R1 is deleted, and is thus no longer available at the target site. However, the source site need not keep track of the effects of garbage collection at the target site. Rather, when the source site initiates a DR operation (e.g., to replicate a VE), it can observe a protocol with the target site. In the example of FIG. 3F, the source site can initiate a cloning process corresponding to an intent (e.g., the shown "Replicate VE1"). It does so by first issuing a query that inquires as to whether or not the target site has the snapshots corresponding to global snapshot IDs SID1 and SID2. The target site responds with a message that indicates snapshot SID2 is available for use. In response the source site will then issue a replication command to the target site, "Replicate VE1 using SID2". The target site complies.

As earlier indicated, garbage collection activities can be carried out independently from any replication activities. As such, it is possible for a garbage collection process (e.g., garbage collection $308_2$) to consider a snapshot for deletion. To avoid the circumstance where the target site has indicated availability of a particular snapshot, which is then deleted by garbage collection, the target site will mark snapshot SID2 as not available for deletion by garbage collection. This marking persists at least until the replication process pertaining to snapshot SID2 has been completed.

Figure 3G:
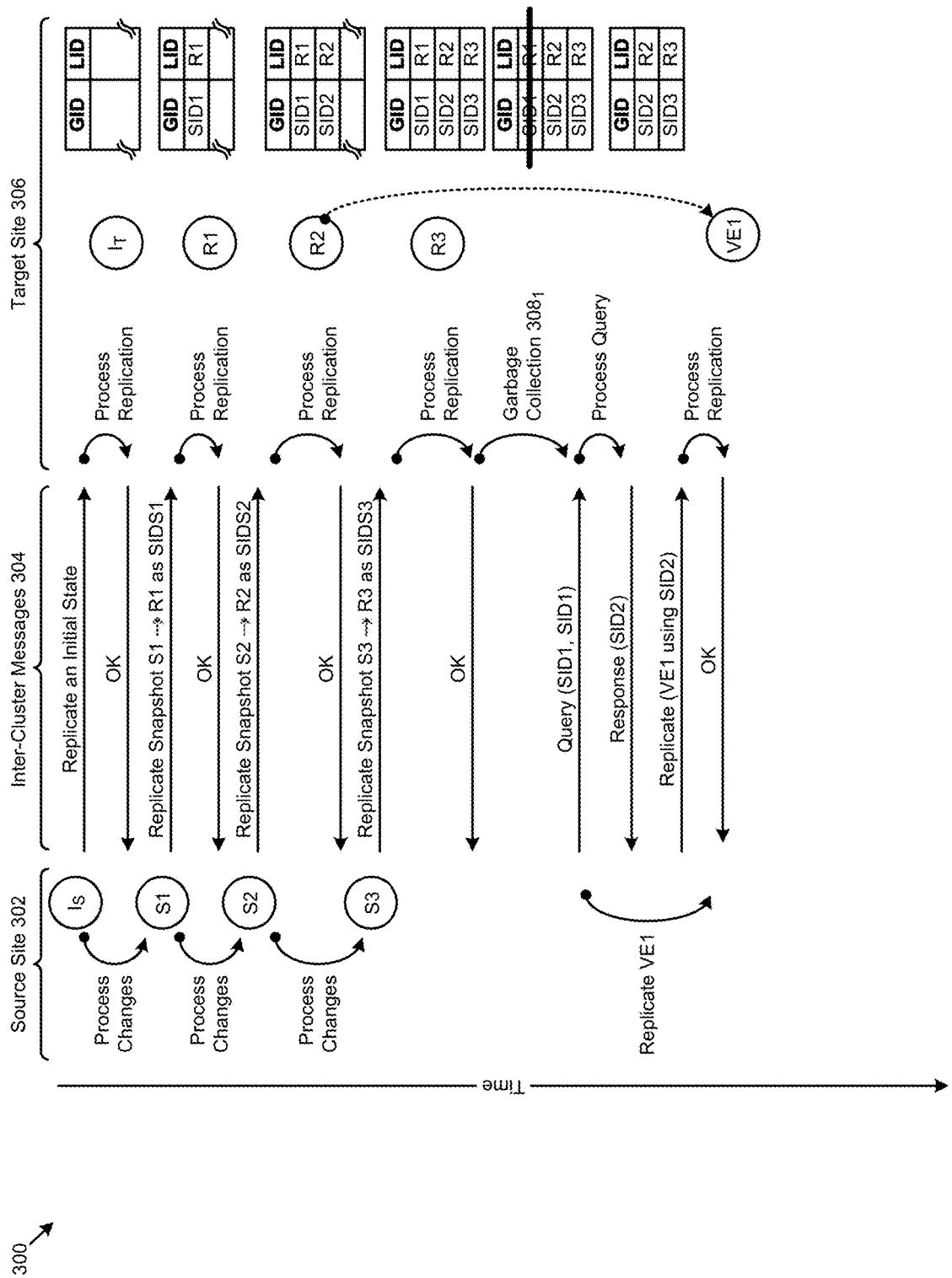

FIG. 3G depicts the situation when the procedure for cloning VE1 has completed. The entity VE1 is available and ready for use at the target site. As indicated in the discussion of FIG. 3F, when the target site intends to use a particular snapshot, it can mark it such that the snapshot will not be subjected to deletion by garbage collection until such time as the replication process pertaining to the snapshot has been completed. In this example scenario, the snapshot SID2 has been used to form VE1 and, as such, a record corresponding to snapshot SID2 is unmarked such that garbage collection can delete SID2 in accordance with its own schedule.

Figure 3H:
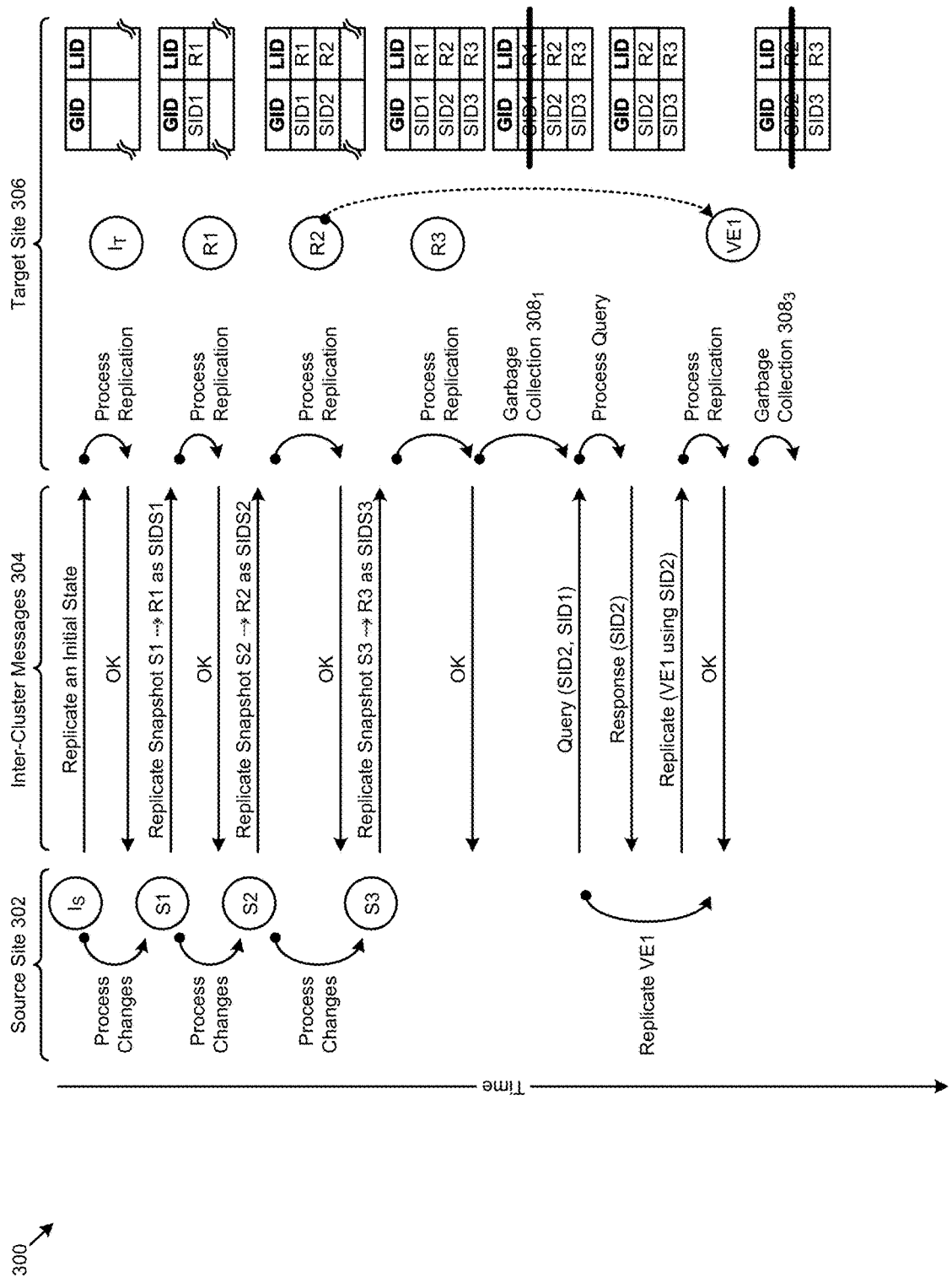

FIG. 3H depicts the case when, after unmarking SID2, a garbage collection process (e.g., garbage collection $308_3$) considers snapshot SID2 for deletion. Since snapshot SID2 has been unmarked, the garbage collection process can delete snapshot SID2. This is shown as a strike-through of the entry for snapshot SID2.

Figure 3I:
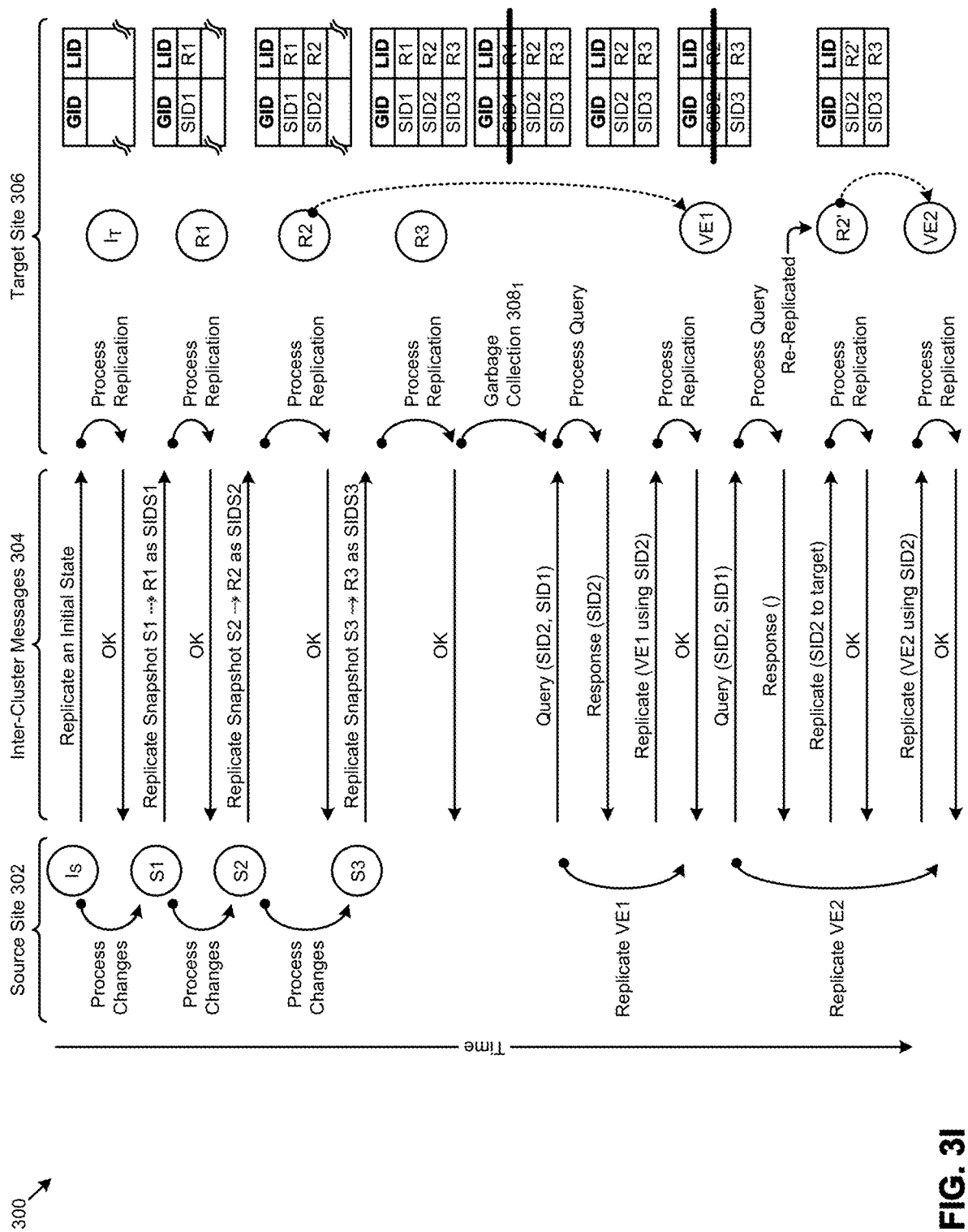

If an incoming replication command then needs snapshot SID2, it would need to be replicated with assistance from the source. This scenario is shown in FIG. 3I. Specifically, the command "Replicate (SID2 to target)" shown near the bottom portion of FIG. 3I initiates a protocol for cloning a virtual entity VE2 even when none of the applicable snapshots are available at the target node.

As depicted, the source site 302 queries the target site 306 to determine if any of a set of snapshots are available at the target site. In the example shown, the query inquires about snapshot SID2 and snapshot SID1, with snapshot SID2 being preferred. At this moment in time, both snapshot SID2 and snapshot SID1 have been deleted by garbage collection, so the target site replies with a negative acknowledgement, shown as "Response( )", where the response returns the null set rather than an acknowledgement of a particular snapshot. Nevertheless, the VE2 can be replicated at the target site by first replicating snapshot SID2. This is shown by the command "Replicate (SID2 to target)", which is received by the target, processed so as to store the contents of snapshot SID2 at the target site in the target's own namespace, updates the data structures to associate the global ID SID2 with the local ID R2 (e.g., shown as "R2'"), and marks the cluster-local copy of the snapshot as not subject to deletion by garbage collection. Once the replication process to replicate snapshot SID2 has completed and the data structures have been updated, the target site responds to the source site with an "OK" acknowledgement.

In some cases, the aforementioned protocol for cloning a virtual entity might include multiple queries and/or multiple replication commands. Strictly as one illustrative example, a desired data state might cover multiple virtual entities. As such several replication commands might be issued from the source cluster to the target cluster to replicate multiple checkpoints for multiple VEs.

Figure 4:
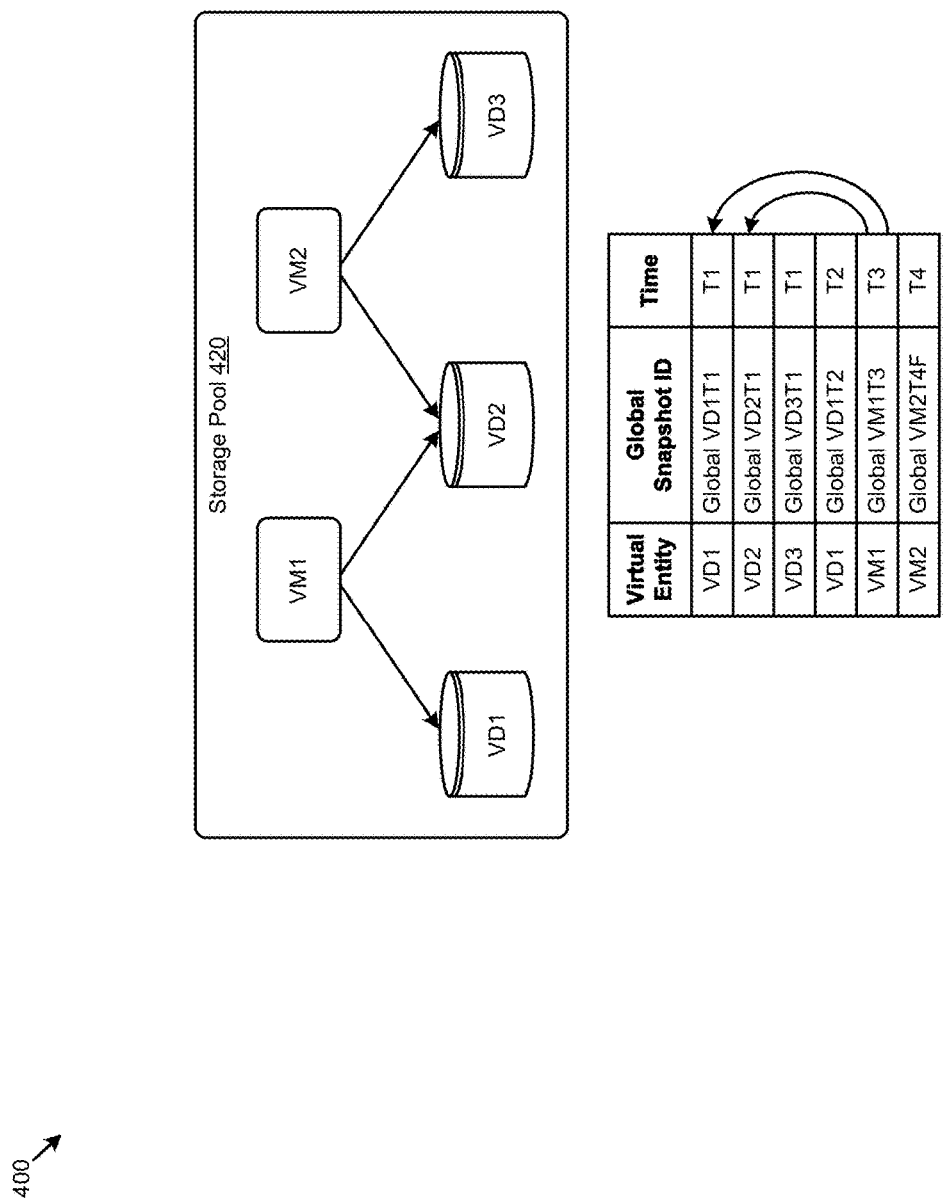
FIG. 4 depicts hierarchical virtual entity relationships and their correspondence to point-in-time snapshots, according to an embodiment.

FIG. 4 depicts hierarchical virtual entity relationships 400 and their correspondence to point-in-time snapshots. As an option, one or more variations of hierarchical virtual entity relationships 400 or any aspect thereof may be implemented in the context of the architecture and functionality of the embodiments described herein. The hierarchical virtual entity relationships 400 or any aspect thereof may be implemented in any environment.

As discussed in the foregoing, a source cluster can issue a command to a target cluster to replicate a particular VE. The command can specify if the replication is to apply to the limited scope of the particular VE, or if the replication is to apply to the hierarchy of VEs under the particular named VE. In some cases, it is more efficient for the source cluster to take snapshots based on a limited scope of a particular VE. In other cases, it is more efficient to take snapshots based on the hierarchy of VEs under the particular named VE.

Hierarchical relationships between VEs are shown in FIG. 4. Specifically, storage pool 420 comprises two VMs, VM1 and VM2, as well as three vDisks, VD1, VD2, and VD3. The VEs are hierarchically related as shown. This particular example depicts both (1) a series of snapshots that are taken with respect to the limited scope of a VE, and (2) a snapshot that is taken with respect to its hierarchy. More specifically, at time T1, snapshots are taken for VD1, VD2, and VD3. A global snapshot ID is assigned to each snapshot. At time T2, another snapshot of VD1 is taken and given a global snapshot ID. Strictly as an illustrative embodiment, the global snapshot IDs include an indication of the time of the snapshot. At time T3, a snapshot for VM1 is taken. This example shows that the snapshot for VM1 at time T3 is taken with respect to the limited scope of a VM1. However, since VM1 has underlying data in its vDisk VD1 and vDisk VD2, the snapshot for VM1 refers back to snapshots of those vDisks. As such, amalgamation of the VM1T3 snapshot, plus the VD2T1 snapshot, plus the VD1T1 snapshot comprises the entire set of snapshot data needed for a complete restoration of VM1 to time T3.

As an alternative to the foregoing amalgamation technique, the figure shows snapshot VM2T4F taken at T4, which snapshot itself (e.g., possibly a checkpoint snapshot) comprises the full set of snapshot data needed for a complete restoration of VM2 to time T4.

A command issued from a source cluster to a target cluster can include the global snapshot ID plus any information needed to identify the full set of snapshots that pertain to the underlying hierarchy.

Given the foregoing, it is possible that a VE can be restored to a particular state using a variety of combinations of snapshots. To accommodate the likelihood of multiple such possibilities, a command from a source site to a target site to request a restoration of a particular VE might include an ordered list of candidate snapshots. This mechanism is highly efficient at least in that, given that garbage collection operates independently between clusters, and given that the most recent snapshots for a particular VE might be "in flight", it is possible that a snapshot that exists on the source cluster does not yet, or no longer exists, on the target cluster. By giving the target cluster a list of multiple snapshots, the source and target clusters can often resolve to an applicable snapshot to restore without the need for repeated queries.

Figure 5:
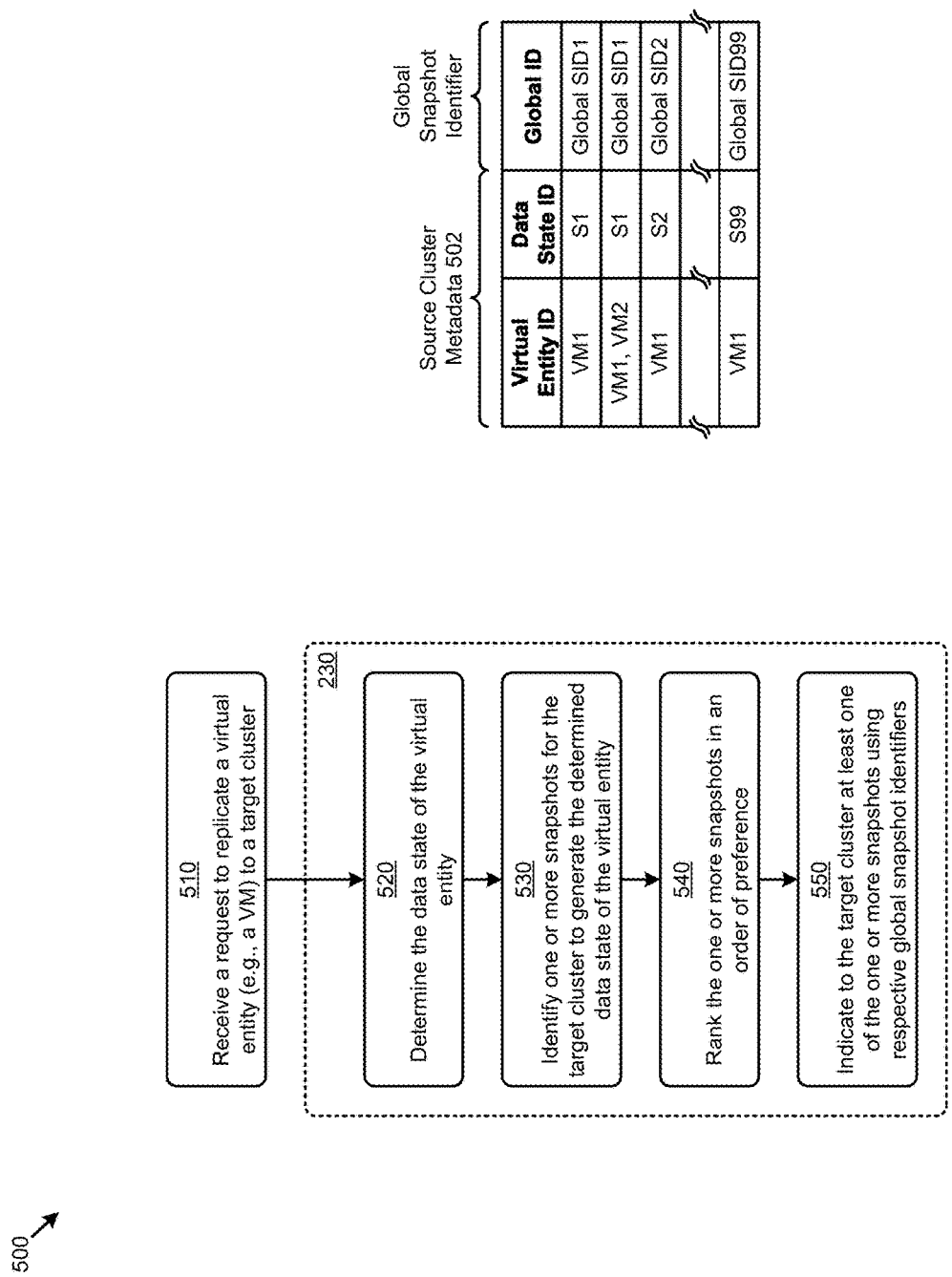
FIG. 5 illustrates a query formulation technique as used in systems that implement global naming for point-in-time backup copies, according to an embodiment.

Techniques for implementing the foregoing mechanism are shown and described in FIG. 5.

FIG. 5 illustrates a query formulation technique 500 as used in systems that implement global naming for point-in-time backup copies. As an option, one or more variations of query formulation technique 500 or any aspect thereof may be implemented in the context of the architecture and functionality of the embodiments described herein. The query formulation technique 500 or any aspect thereof may be implemented in any environment.

The figure is being presented to illustrate how a source site can compose a message to a target computing cluster, where the message comprises an inquiry as to whether or not the target computing cluster can replicate a particular virtual entity to a particular data state based on a particular snapshot identified by a global snapshot identifier. Specifically, and as shown, when the source site receives a request to perform replication operations (e.g., clone, migrate) over a virtual entity (step 510), the source site will determine the then-current data state of the virtual entity (step 520). Any known technique can be used to determine the then-current data state of the virtual entity.

Further details regarding general approaches to determining the then-current data state of virtual entities are described in U.S. application Ser. No. 15/018,395 titled "VIRTUAL MACHINE BRING-UP WITH ON-DEMAND PROCESSING OF STORAGE REQUESTS", filed on Feb. 8, 2016, which is hereby incorporated by reference in its entirety.

Based on the determined then-current state of the virtual entity, metadata at source cluster metadata 502 is accessed to identify one or more snapshots that correspond to the determined then-current state. In some cases, if the determined then-current state has not yet been snapshotted, then a recent snapshot might be used. In still further cases, it can happen that there might be multiple snapshots (e.g., checkpointed snapshots, incremental snapshots, etc.) that represents the desired data state of the VE. In some cases, the desired data state can be represented as a grouping of snapshots rather than just a single snapshot. Step 530 serves to identify one or more snapshots to be used to generate the desired data state of the virtual entity. When there are multiple snapshots that can be used to represent the desired data state of the VE, the source site will rank the multiple snapshots in order of preference (step 540).

This operation to provide multiple snapshots to the target cluster (step 550) increases the likelihood that the target cluster will have at least one of the multiple snapshots. As an illustrative example, a particular data state can be constructed by using a recently closed checkpoint snapshot, or a particular data state can be constructed by cascading multiple incremental snapshots. Accordingly, the source will rank the multiple snapshots in order of preference such that the target cluster need only acknowledge the first available snapshot from the ordered list. This technique to present and process a list of preferred snapshots between the source site and the target cluster is further discussed in FIG. 6.

Figure 6:
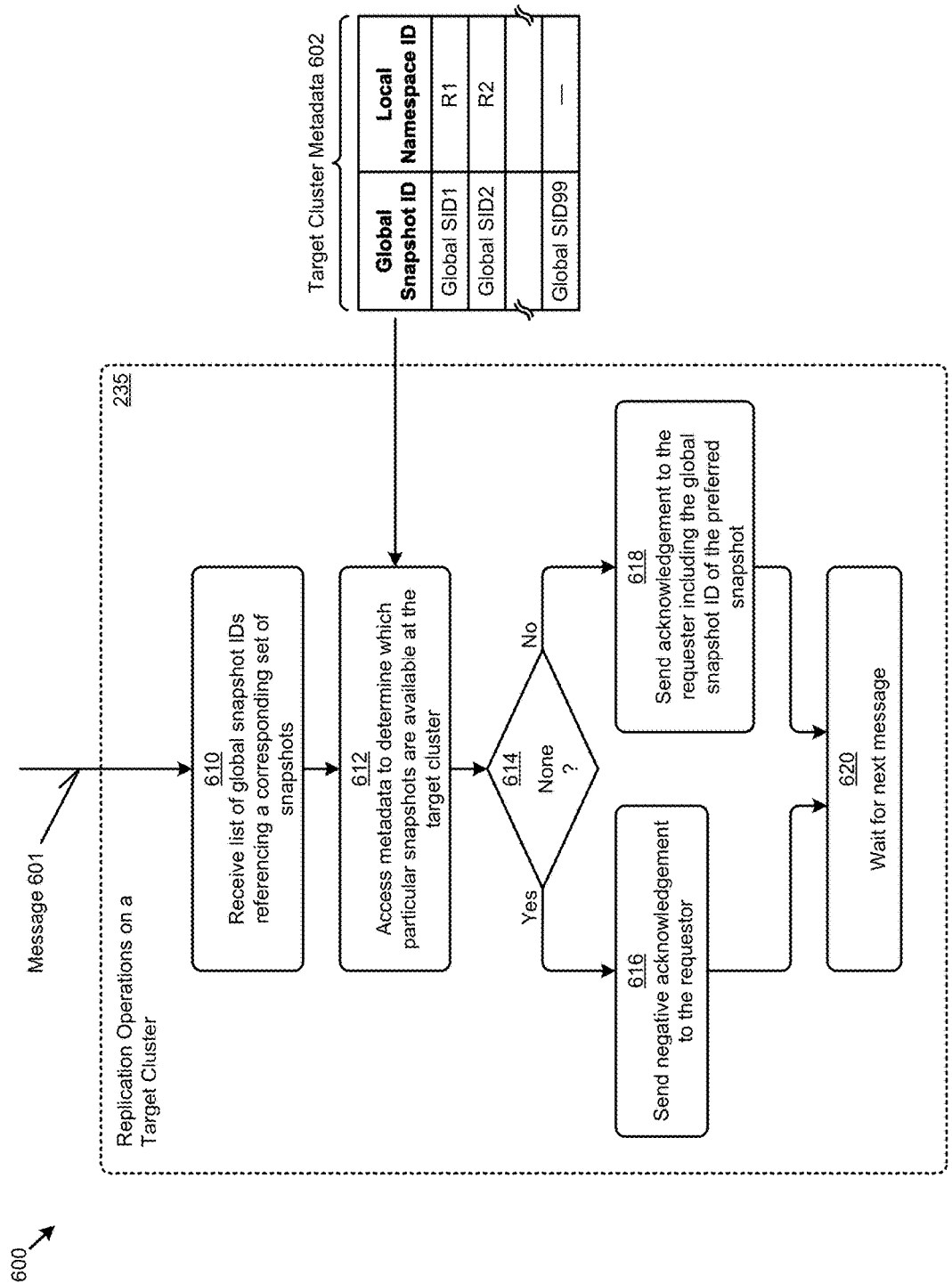
FIG. 6 illustrates a query response generation technique as used in systems that implement global naming of disaster recovery data, according to an embodiment.

FIG. 6 illustrates a query response generation technique 600 as used in systems that implement global naming of disaster recovery data. As an option, one or more variations of query response generation technique 600 or any aspect thereof may be implemented in the context of the architecture and functionality of the embodiments described herein. The query response generation technique 600 or any aspect thereof may be implemented in any environment.

FIG. 6 illustrates a set of steps carried out by a target cluster upon receiving a query message from a source cluster. The steps pertain to carrying out an inter-cluster protocol such that a source cluster can ascertain whether or not a target cluster is able to construct a data state that comports with a particular data state specified by a source cluster using a global name. Specifically, the figure depicts one technique whereby a target cluster processes an inquiry from a source to determine which one (if any) of a list of snapshots are present at the target.

As shown, a message 601 is received at the target cluster (step 610). The message comprises an ordered list of possible snapshots to be used. The target cluster in turn can select one (or none) from the list based on the most preferred one from the ordered list that the target cluster has in its storage areas. In some cases, such as in the case of a most-preferred-to-less-preferred ordering, the first one in the list is the most preferred. In some cases, the most preferred snapshot to be used at the target cluster is determined by the target cluster based on the then-current conditions at the target cluster. For example, in cases where a desired data state corresponds to a snapshot that can be constructed (e.g., by the target cluster) using multiple different construction techniques, and in cases that involve multiple sets of dependencies, the target cluster is able to choose what approach to take when determining a preferred snapshot and/or how to construct such a preferred snapshot from data that is available at the target cluster.

The target cluster accesses its own directories, file catalogues, databases or any other type of data structures that indicated the presence of a particular snapshot. In some cases, and as shown at step 612, a table in the form of metadata serves to indicate the presence or absence of a particular item to be accessed. In the specific example of FIG. 6, target cluster metadata 602 is indexed by a global snapshot ID. The indexing operation performs a look-up and retrieval of the local namespace ID of the snapshot data that is associated with a particular global snapshot ID. For example, a global snapshot ID is associated with the replicated snapshot R2. This is indicated in a row of the aforementioned table. The table is maintained to serve as a complete listing of all global snapshots that have been stored at the target cluster and which remain stored and/or accessible at the target. In some cases, a row can be deleted if the underlying replicated snapshot has been deleted (e.g., by garbage collection). In other cases, only the indication of the local namespace ID of the snapshot data at the target cluster is deleted or marked as unavailable.

In any of the foregoing cases, the target can make the determination before decision 614. If the target cluster determines that there is at least one of the snapshots referred to in message 601 then, at step 618, the "No" branch is taken, and an acknowledgement is sent to the source cluster. The acknowledgement includes at least one global snapshot ID. Moreover, the specific global snapshot ID returned in the acknowledgement is the most preferred global snapshot ID found in message 601. It can happen that none of the global snapshot IDs found in message 601 are available at the target. In such cases, the "Yes" branch of decision 614 is taken and, at step 616, the target cluster sends a negative acknowledgement to the source cluster. Occurrences of negative acknowledgements are predictably less likely than occurrences of positive acknowledgements.

In the former example case of positive acknowledgements, the source cluster might send a replication command instructing the target cluster to replicate (e.g., clone, migrate, etc.) a VE based on the data state corresponding to the snapshot that is now known to exist on the target. In the latter case of a negative acknowledgement, the next action that the source cluster might take is to send the snapshot data of interest to the target. As earlier indicated, cases of negative acknowledgements are predictably less likely than cases of positive acknowledgements. Nevertheless, if the target cluster does not have the snapshot data of interest, either because it had been deleted (e.g., in garbage collection) or because it has not yet been received and catalogued at the target, or if for any other reason the target does not have the snapshot data of interest, that situation can be remediated by having the source cluster send the snapshot to the target cluster, after which, the target cluster can use the snapshot of interest to replicate a VE to a desired data state.

In certain cases, several snapshots are needed to restore a particular VE to a desired state. For example, the desired data state of a particular VM might depend on the data state of a plurality of vDisks or other VEs as well as the configuration state of the VM itself. In such cases, data dependencies on snapshots and/or checkpoints and/or configurations of VEs can be determined, and snapshot reconstruction operations can be carried out in any order that satisfies the determined data dependencies.

In certain cases, rather than replicating a snapshot with a data state and then replicating a VE to bring in that data state, the source cluster might package the then-current data state as well as the then-current configuration state of a VE into a single package. The single package is given a UUID, then sent to the target with a command to replicate the VE using the identified single package.

Whether the target cluster sends a negative acknowledgement (step 616) or a positive acknowledgement (step 618), the target cluster then waits for a next message (at step 620) in the protocol. In many cases, the next messages from the source cluster are replication commands (e.g., "Replicate SID2 to target", and/or "Replicate VE1 using SID2").

Figure 7:
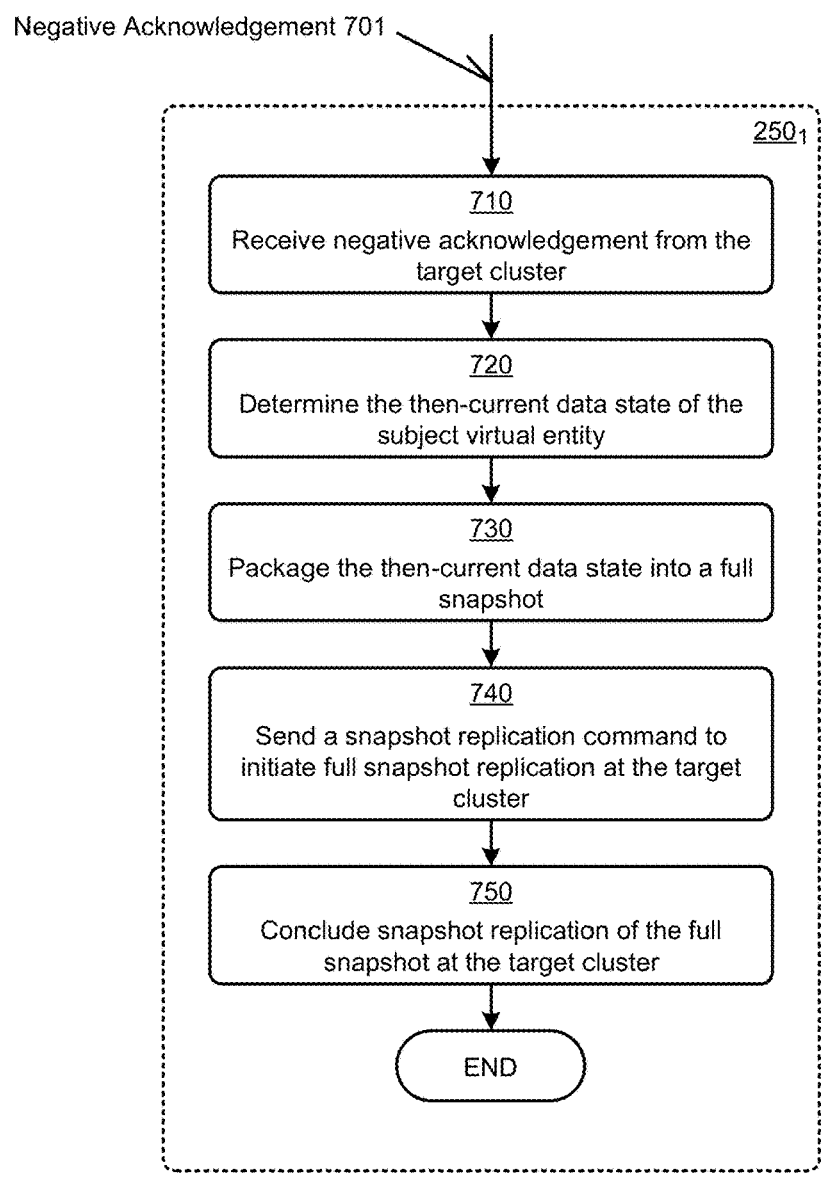
FIG. 7 presents a query response processing technique as used in systems that implement global naming of disaster recovery data, according to an embodiment.

FIG. 7 presents a query response processing technique 700 as used in systems that implement global naming of disaster recovery data. As an option, one or more variations of query response processing technique 700 or any aspect thereof may be implemented in the context of the architecture and functionality of the embodiments described herein. The query response processing technique 700 or any aspect thereof may be implemented in any environment.

FIG. 7 illustrates one aspect pertaining to carrying out an inter-cluster protocol such that a source cluster can ascertain whether or not a target cluster is able to construct a data state that comports with a particular data state specified by a source cluster using a global name. Specifically, the figure is being presented to illustrate a flow of operations performed by a source cluster when a negative acknowledgement 701 is received from a target cluster (step 710). To the source cluster, a negative acknowledgement means that the target cluster does not have the particular snapshot of interest. To remediate under this circumstance, the source cluster determines the up-to-date, then-current data state of the VE to be replicated at the target cluster (step 720), packages the determined state into a global snapshot that has an associated global snapshot ID (step 730) and initiates snapshot replication (step 740) to replicate the global snapshot at the target cluster.

In some cases, the global snapshot to be replicated at the target cluster is large. In such situations, there may be a time duration between the time of initiation of the snapshot replication of step 740, and a time when the snapshot is actually stored at the target cluster and/or a time when the operations carried out between the source cluster and the target cluster are concluded (at step 750). As such, during performance of the steps of query response processing technique 700, the source cluster continues processing within step $250_1$ until such time as the target cluster acknowledges replication of the up-to-date, then-current data state of the VE to be replicated. After the target cluster acknowledges replication of the up-to-date, then-current data state of the VE to be replicated and sends a response (e.g., "OK") to the source cluster, the source cluster can then issue replication commands pertaining to the just replicated data state.

Referring again to the flow of FIG. 2, and specifically referring to the message exchange underlying step $260_1$, the next messages from the source cluster are replication commands (e.g., "Replicate SID2 to target" and/or "Replicate VE1 using SID2"). More specifically, upon completing the operations underlying step $250_1$ of FIG. 2 and FIG. 7, processing continues by initiating operations underlying step $260_1$ of FIG. 2.

Figure 8:
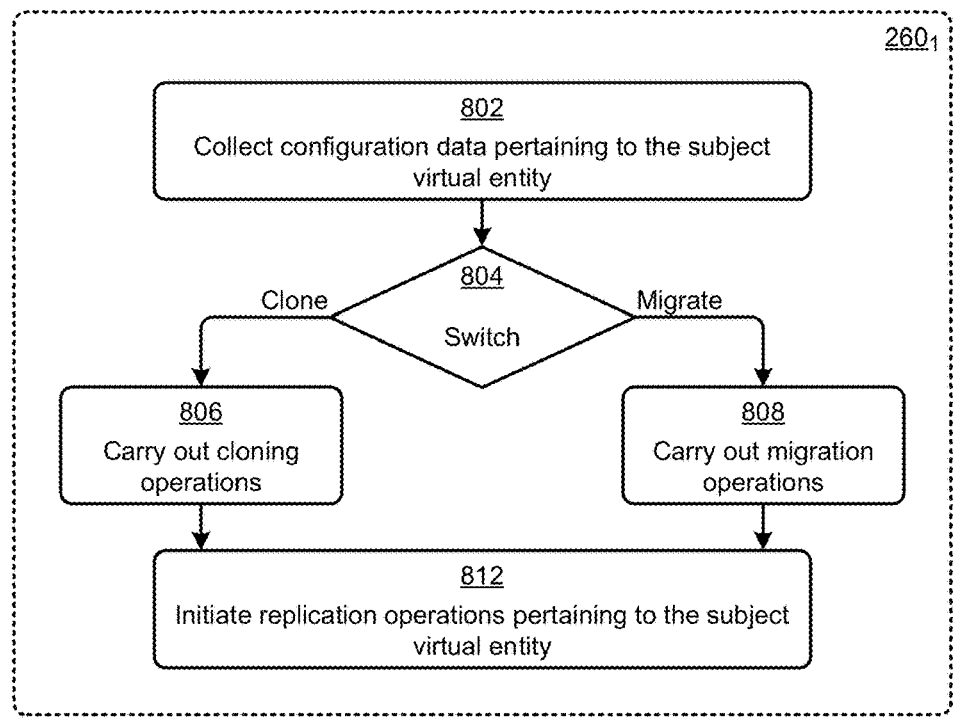
FIG. 8 depicts use cases as are used in systems that implement global naming for replication operations, according to an embodiment.

Operations underlying step $260_1$ are depicted in the example replication use cases as shown and described pertaining to FIG. 8.

FIG. 8 depicts use cases 800 as are used in systems that implement global naming for replication operations. As an option, one or more variations of replication use cases 800 or any aspect thereof may be implemented in the context of the architecture and functionality of the embodiments described herein. The replication use cases 800 or any aspect thereof may be implemented in any environment.

After determining that the target cluster has the particular snapshot that corresponds to a particular data state of a particular VE, the source cluster can invoke VE replication. In the specific use cases of FIG. 8, such VE replication can include a clone operation or a migrate operation. In the shown cloning operation, the VE remains at both the source cluster and the target cluster. In the shown migrate operation, the virtual entity to be migrated is marked for deletion.

As shown, the operations underlying step $260_1$ begin when, at step 802, the source cluster collects configuration data pertaining to a subject virtual entity. A process at the source cluster determines the particular replication operation to be performed. The process at the source cluster that determines the particular replication operation to be performed might be a supervisor process, or a hypervisor, or a special controller virtual machine (CVM), or a controller executable container, or a service virtual machine (SVM), or a service executable container, or a "storage controller". In any of the foregoing cases, the source cluster can switch at decision 804 on the basis of a command from such a process at the source cluster. In the case of cloning operations being requested, step 806 carries out cloning operations. In the case of migration operations being requested, step 808 carries out migration operations. When the cloning or migration operations are completed, step 812 is entered, whereupon the process waits for a next replication operation request.

Additional Embodiments of the Disclosure

Additional Practical Application Examples

Figure 9:
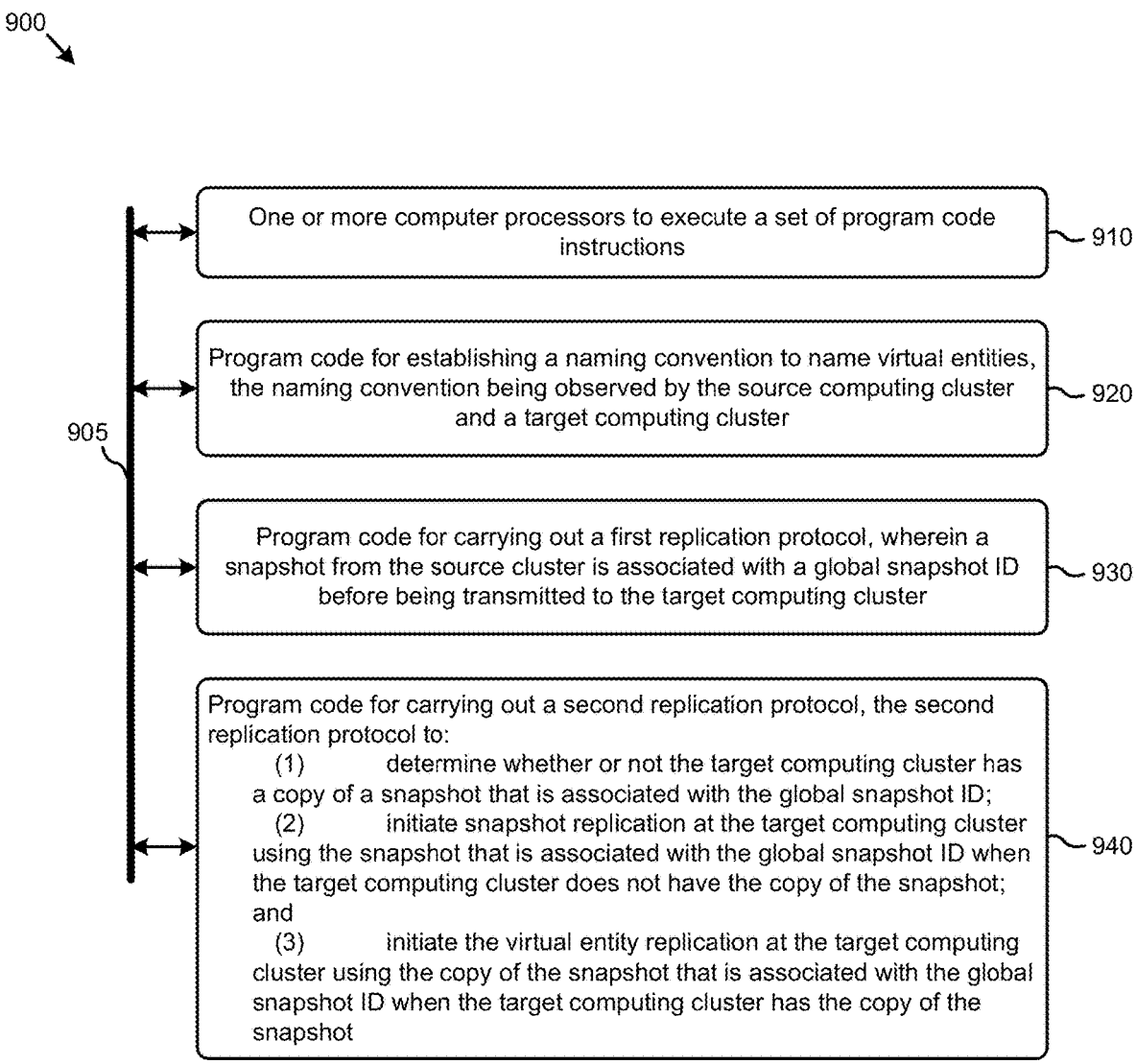
FIG. 9 depicts system components as arrangements of computing modules that are interconnected so as to implement certain of the herein-disclosed embodiments.

FIG. 9 depicts a system 900 as an arrangement of computing modules that are interconnected so as to operate cooperatively to implement certain of the herein-disclosed embodiments. This and other embodiments present particular arrangements of elements that, individually and/or as combined, serve to form improved technological processes that address resolving name space differences and context differences when performing replication operations between clusters. The partitioning of system 900 is merely illustrative and other partitions are possible. As an option, the system 900 may be implemented in the context of the architecture and functionality of the embodiments described herein. Of course, however, the system 900 or any operation therein may be carried out in any desired environment.

The system 900 comprises at least one processor and at least one memory, the memory serving to store program instructions corresponding to the operations of the system. As shown, an operation can be implemented in whole or in part using program instructions accessible by a module. The modules are connected to a communication path 905, and any operation can communicate with other operations over communication path 905. The modules of the system can, individually or in combination, perform method operations within system 900. Any operations performed within system 900 may be performed in any order unless as may be specified in the claims.

The shown embodiment implements a portion of a computer system, presented as system 900, comprising one or more computer processors to execute a set of program code instructions (module 910) and modules for accessing memory to hold program code instructions to perform: establishing a naming convention to name virtual entities, the naming convention being observed by the source computing cluster and a target computing cluster (module 920); carrying out a first replication protocol, wherein a snapshot from the source cluster is associated with a global snapshot ID before being transmitted to the target computing cluster (module 930); carrying out a second replication protocol, the second replication protocol to (1) determine whether or not the target computing cluster has a copy of a snapshot that is associated with the global snapshot ID; (2) initiate snapshot replication at the target computing cluster using the snapshot that is associated with the global snapshot ID when the target computing cluster does not have the copy of the snapshot; and (3) initiate the virtual entity replication at the target computing cluster using the copy of the snapshot that is associated with the global snapshot ID when the target computing cluster has the copy of the snapshot (module 940).

Variations of the foregoing may include more or fewer of the shown modules. Certain variations may perform more or fewer (or different) steps and/or certain variations may use data elements in more or in fewer (or different) operations. Still further, some embodiments include variations in the operations performed, and some embodiments include variations of aspects of the data elements used in the operations.

System Architecture Overview

Additional System Architecture Examples

Figure 10A:
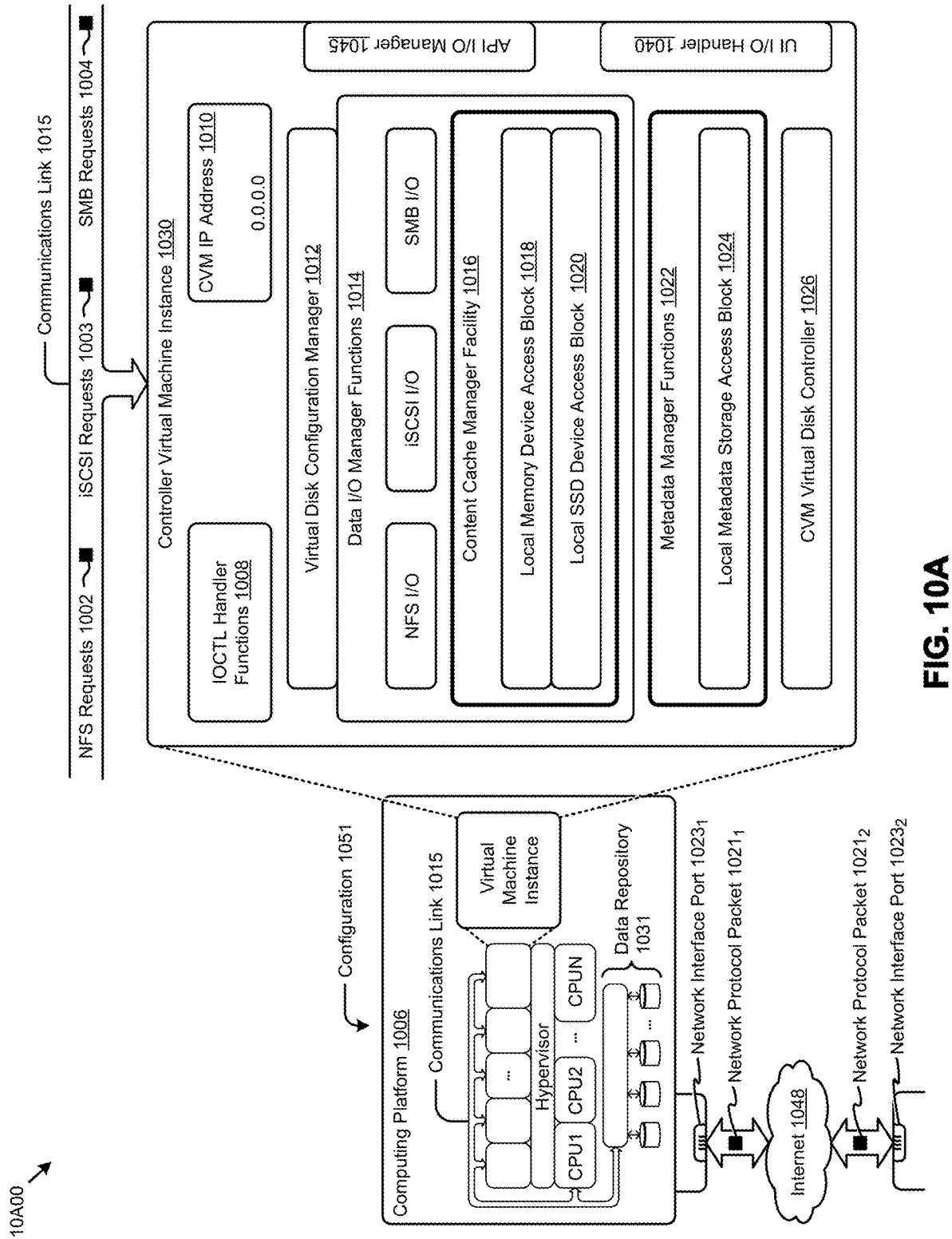
FIG. 10A, FIG. 10B, and FIG. 10C depict virtualized controller architectures comprising collections of interconnected components suitable for implementing embodiments of the present disclosure and/or for use in the herein-described environments.

FIG. 10A depicts a virtualized controller as implemented by the shown virtual machine architecture 10A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 10A00 comprises a collection of interconnected components suitable for implementing embodiments of the present disclosure and/or for use in the herein-described environments. Moreover, virtual machine architecture 10A00 includes a virtual machine instance in configuration 1051 that is further described as pertaining to controller virtual machine instance 1030. Configuration 1051 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 1030.

In this and other configurations, a controller virtual machine instance receives block I/O (input/output or IO) storage requests as network file system (NFS) requests in the form of NFS requests 1002, and/or internet small computer storage interface (iSCSI) block IO requests in the form of iSCSI requests 1003, and/or Samba file system (SMB) requests in the form of SMB requests 1004. The controller virtual machine (CVM) instance publishes and responds to an internet protocol (IP) address (e.g., CVM IP address 1010). Various forms of input and output (I/O or IO) can be handled by one or more IO control handler functions (e.g., IOCTL handler functions 1008) that interface to other functions such as data IO manager functions 1014 and/or metadata manager functions 1022. As shown, the data IO manager functions can include communication with virtual disk configuration manager 1012 and/or can include direct or indirect communication with any of various block 10 functions (e.g., NFS IO, iSCSI IO, SMB 10, etc.).

In addition to block IO functions, configuration 1051 supports IO of any form (e.g., block IO, streaming IO, packet-based IO, HTTP traffic, etc.) through either or both of a user interface (UI) handler such as UI IO handler 1040 and/or through any of a range of application programming interfaces (APIs), possibly through API IO manager 1045.

Communications link 1015 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or persistent random access memories (RAPMs) or optical or magnetic media drives such as paper tape or magnetic tape drives. Volatile media includes dynamic memory such as random access memory. As shown, controller virtual machine instance 1030 includes content cache manager facility 1016 that accesses storage locations, possibly including local dynamic random access memory (DRAM) (e.g., through local memory device access block 1018) and/or possibly including accesses to local solid state storage (e.g., through local SSD device access block 1020).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 1031, which in turn can be formatted into any one or more storage areas, and which can comprise parameterized storage accessible by a key (e.g., a filename, a table name, a block address, an offset address, etc.). Data repository 1031 can store any forms of data and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 1024. The data repository 1031 can be configured using CVM virtual disk controller 1026, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 1051 can be coupled by communications link 1015 (e.g., backplane, LAN, PSTN, wired or wireless network, etc.) and each instance may perform respective portions of sequences of instructions as may be required to practice embodiments of the disclosure.

The shown computing platform 1006 is interconnected to the Internet 1048 through one or more network interface ports (e.g., network interface port 10231 and network interface port 10232). Configuration 1051 can be addressed through one or more network interface ports using an IP address. Any operational element within computing platform 1006 can perform sending and receiving operations using any of a range of network protocols, possibly including network protocols that send and receive packets (e.g., network protocol packet 10211 and network protocol packet 10212).

Computing platform 1006 may transmit and receive messages that can be composed of configuration data and/or any other forms of data and/or instructions organized into a data structure (e.g., communications packets). In some cases, the data structure includes program code instructions (e.g., application code) communicated through the Internet 1048 and/or through any one or more instances of communications link 1015. Received program code may be processed and/or executed by a CPU as it is received and/or program code may be stored in any volatile or non-volatile storage for later execution. Program code can be transmitted via an upload (e.g., an upload from an access device over the Internet 1048 to computing platform 1006). Further, program code and/or the results of executing program code can be delivered to a particular user via a download (e.g., a download from computing platform 1006 over the Internet 1048 to an access device).

Configuration 1051 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to use of global names in a protocol for handling distributed point-in-time snapshots. In some embodiments, a module may include one or more state machines and/or combinational logic used to implement or facilitate the operational and/or performance characteristics pertaining to use of global names in a protocol for handling distributed point-in-time snapshots.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of use of global names in a protocol for handling distributed point-in-time snapshots). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to use of global names in a protocol for handling distributed point-in-time snapshots, and/or for improving the way data is manipulated when performing computerized operations pertaining to carrying out an inter-cluster protocol such that a source cluster can ascertain whether or not a target cluster is able to construct a data state that comports with a particular data state specified by a source cluster using a global name.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 10B:
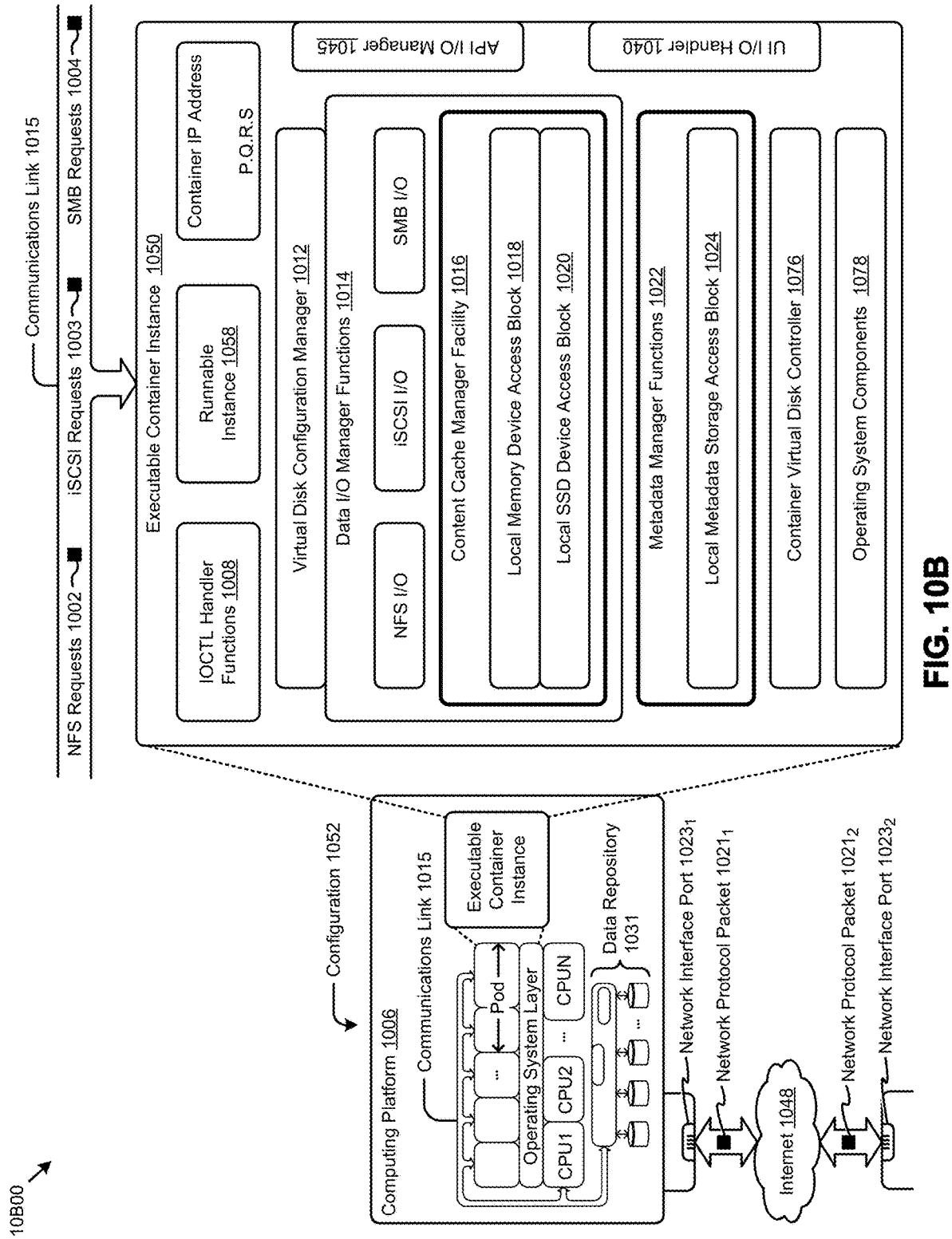

FIG. 10B depicts a virtualized controller implemented by containerized architecture 10B00. The containerized architecture comprises a collection of interconnected components suitable for implementing embodiments of the present disclosure and/or for use in the herein-described environments. Moreover, the shown containerized architecture 10B00 includes an executable container instance in configuration 1052 that is further described as pertaining to executable container instance 1050. Configuration 1052 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 1050). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container or as a controller executable container. Any executable container of any sort can be rooted in a directory system, and can be configured to be accessed by file system commands (e.g., "ls" or "ls -a", etc.). The executable container might optionally include operating system components 1078, however such a separate set of operating system components need not be provided. As an alternative, an executable container can include runnable instance 1058, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 1076. Such a container virtual disk controller can perform any of the functions that the aforementioned CVM virtual disk controller 1026 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 10C:
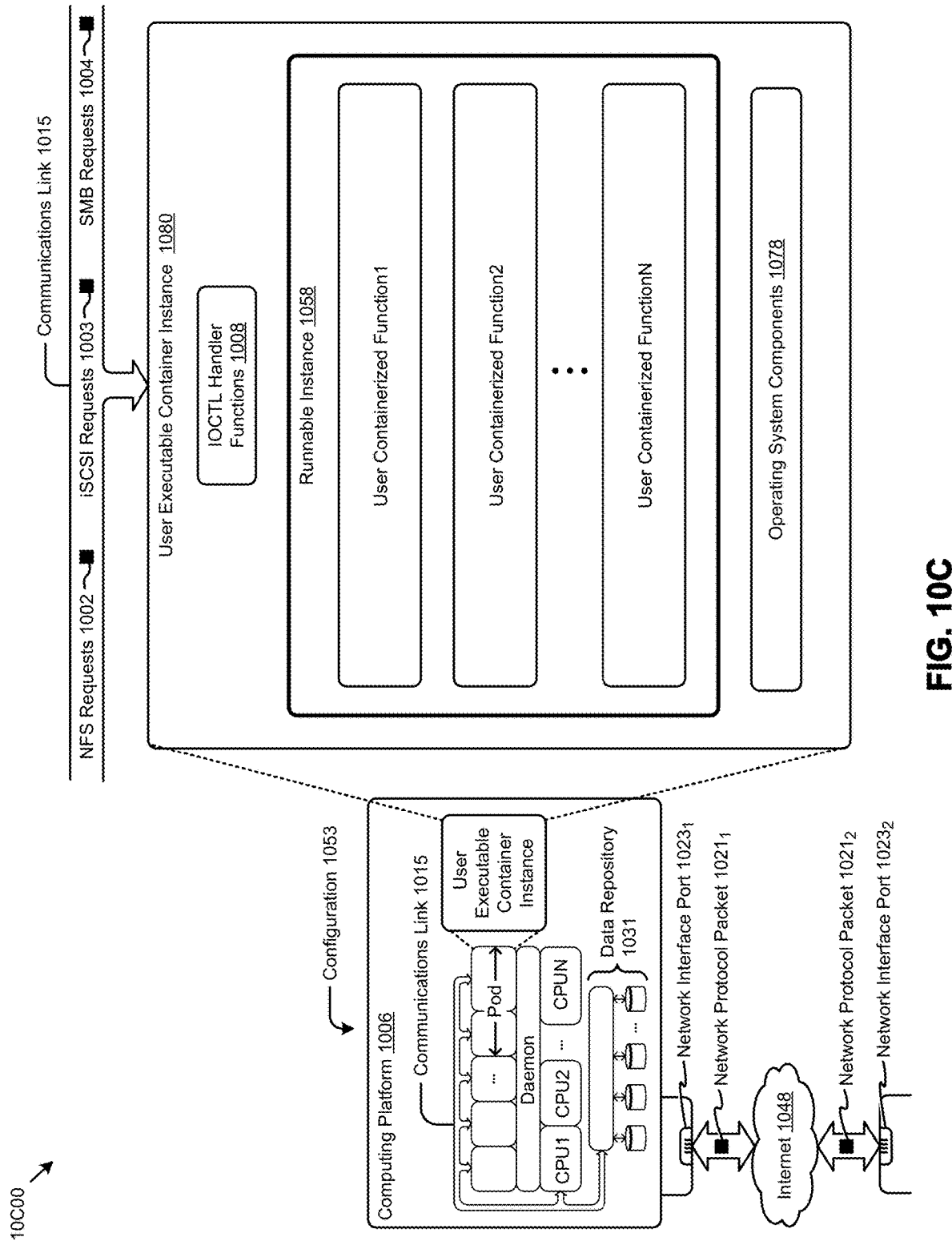

FIG. 10C depicts a virtualized controller implemented by a daemon-assisted containerized architecture 10C00. The containerized architecture comprises a collection of interconnected components suitable for implementing embodiments of the present disclosure and/or for use in the herein-described environments. Moreover, the shown daemon-assisted containerized architecture includes a user executable container instance in configuration 1053 that is further described as pertaining to user executable container instance 1080. Configuration 1053 includes a daemon layer (as shown) that performs certain functions of an operating system.

User executable container instance 1080 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 1058). In some cases, the shown operating system components 1078 comprise portions of an operating system, which portions are interfaced with or included in the runnable instance and/or any user containerized functions. In this embodiment of a daemon-assisted containerized architecture, the computing platform 1006 might or might not host operating system components other than operating system components 1078. More specifically, the shown daemon might or might not host operating system components other than operating system components 1078 of user executable container instance 1080.

The virtual machine architecture 10A00 of FIG. 10A and/or the containerized architecture 10B00 of FIG. 10B and/or the daemon-assisted containerized architecture 10C00 of FIG. 10C can be used in any combination to implement a distributed platform that contains multiple servers and/or nodes that manage multiple tiers of storage where the tiers of storage might be formed using the shown data repository 1031 and/or any forms of network accessible storage. As such, the multiple tiers of storage may include storage that is accessible over communications link 1015. Such network accessible storage may include cloud storage or networked storage (e.g., a SAN or "storage area network"). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices, such as SSDs or RAPMs, or hybrid HDDs or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term vDisk refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 1051 of FIG. 10A) to manage the interactions between the underlying hardware and user virtual machines or containers that run client software.

Distinct from user virtual machines or user executable containers, a special controller virtual machine (e.g., as depicted by controller virtual machine instance 1030) or as a special controller executable container is used to manage certain storage and I/O activities. Such a special controller virtual machine is referred to as a "CVM", or as a controller executable container, or as a service virtual machine "SVM", or as a service executable container, or as a "storage controller". In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
   replicating a snapshot from a source computing cluster to a target computing cluster wherein the snapshot is associated with a global snapshot ID that is consistent across multiple clusters; and
   performing disaster recovery by:
      determining whether the target computing cluster has a copy of the snapshot that is associated with the global snapshot ID;
      initiating virtual entity replication at the target computing cluster using the copy of the snapshot that is associated with the global snapshot ID when the target computing cluster does have the copy of the snapshot; and
      initiating snapshot replication at the target computing cluster to create a newly-replicated copy of the snapshot that is associated with the global snapshot ID when the target computing cluster does not have the copy of the snapshot.

2. The method of claim 1, wherein the virtual entity replication at the target computing cluster uses the newly-replicated copy of the snapshot that is associated with the global snapshot ID.

3. The method of claim 1, wherein a second replication protocol is carried out that comprises sending a message from the source computing cluster, the message comprising a candidate snapshot.

4. The method of claim 3, wherein the message comprises an ordered list of candidate snapshots.

5. The method of claim 1, wherein a local name of the snapshot that is associated with a global snapshot ID is stored in at least one of, a row of a table, or a key-value pair.

6. The method of claim 1 wherein the global snapshot ID is a universally unique identifier (UUID) having a length of 128 bits or more.

7. The method of claim 1, further comprising determining a set of two or more snapshot IDs that are sent to the target computing cluster in a replication command message.

8. The method of claim 7 wherein the target computing cluster determines how to construct a preferred snapshot from the set of two or more snapshot IDs that are sent to the target computing cluster.

9. The method of claim 1, wherein at least one of, a virtual machine, a virtual disk, or a virtual network interface is replicated at the target computing cluster.

10. A non-transitory computer readable medium having stored thereon a sequence of instructions which, when stored in memory and executed by a processor causes the processor to perform a process comprising:
    replicating a snapshot from a source computing cluster to a target computing cluster, wherein the snapshot is associated with a global snapshot ID that is consistent across multiple clusters; and
    performing disaster recovery by:
       determining whether the target computing cluster has a copy of the snapshot that is associated with the global snapshot ID;
       initiating virtual entity replication at the target computing cluster using the copy of the snapshot that is associated with the global snapshot ID when the target computing cluster does have the copy of the snapshot; and
       initiating snapshot replication at the target computing cluster to create a newly-replicated copy of the snapshot that is associated with the global snapshot ID when the target computing cluster does not have the copy of the snapshot.

11. The computer readable medium of claim 10, wherein a second replication protocol is carried out that comprises sending a message from the source computing cluster, the message comprising a candidate snapshot.

12. The computer readable medium of claim 11, wherein the message comprises an ordered list of candidate snapshots.

13. The computer readable medium of claim 10, wherein a local name of the snapshot that is associated with a global snapshot ID is stored in at least one of, a row of a table, or a key-value pair.

14. The computer readable medium of claim 10 wherein the global snapshot ID is a universally unique identifier (UUID) having a length of 128 bits or more.

15. The computer readable medium of claim 10:
wherein the source computing cluster computing cluster performs storage I/O operations to its respective storage pool having a source cluster-local contiguous address space that is shared by two or more nodes of the source computing cluster.

16. The computer readable medium of claim 10, further comprising instructions which, when stored in memory and executed by the processor causes the processor to determine a set of two or more snapshot IDs that are sent to the target computing cluster in a replication command message.

17. The computer readable medium of claim 16 wherein the target computing cluster determines how to construct a preferred snapshot from the set of two or more snapshot IDs that are sent to the target computing cluster.

18. The computer readable medium of claim 10, wherein at least one of, a virtual machine, a virtual disk, or a virtual network interface is replicated at the target computing cluster.

19. A system for performing virtual entity replication between a source computing cluster and a target computing cluster comprising:
 a storage medium having stored thereon a sequence of instructions; and
 a processor that execute the sequence of instructions to cause the processor to perform a set of acts, the set of acts comprising,
  replicating a snapshot from a source computing cluster to a target computing cluster, wherein the snapshot is associated with a global snapshot ID that is consistent across multiple clusters; and
  performing disaster recovery by:
   determining whether the target computing cluster has a copy of the snapshot that is associated with the global snapshot ID;
   initiating virtual entity replication at the target computing cluster using the copy of the snapshot that is associated with the global snapshot ID when the target computing cluster does have the copy of the snapshot; and
   initiating snapshot replication at the target computing cluster to create a newly-replicated copy of the snapshot that is associated with the global snapshot ID when the target computing cluster does not have the copy of the snapshot.

20. The system of claim 19, wherein a second replication protocol is carried out that sends a message from the source computing cluster, the message comprising a plurality of candidate snapshots.

* * * * *